United States Patent
Hara et al.

(10) Patent No.: US 8,020,878 B2
(45) Date of Patent: Sep. 20, 2011

(54) BODY LEANING CONTROL SYSTEM, AND A SADDLE RIDING TYPE VEHICLE HAVING THE SAME

(75) Inventors: Nobuo Hara, Shizuoka (JP); Yasuhiro Oomura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 281 days.

(21) Appl. No.: 12/511,089

(22) Filed: Jul. 29, 2009

(65) Prior Publication Data

US 2010/0032914 A1    Feb. 11, 2010

(30) Foreign Application Priority Data

Aug. 8, 2008 (JP) ................................. 2008-206075

(51) Int. Cl.
*B60G 17/015* (2006.01)
(52) U.S. Cl. ................ 280/5.509; 280/124.103; 701/37; 701/38
(58) Field of Classification Search ............... 280/5.506, 280/5.507, 5.509, 124.103; 701/37, 38
See application file for complete search history.

(56) References Cited

U.S. PATENT DOCUMENTS

| | | | |
|---|---|---|---|
| 6,267,387 B1 * | 7/2001 | Weiss | 280/5.52 |
| 6,406,036 B1 * | 6/2002 | Laurent et al. | 280/5.509 |
| 7,343,997 B1 * | 3/2008 | Matthies | 180/215 |
| 7,802,800 B2 * | 9/2010 | Melcher | 280/5.509 |
| 2005/0012291 A1 | 1/2005 | Bagnoli | |
| 2007/0151780 A1 * | 7/2007 | Tonoli et al. | 180/65.1 |
| 2007/0193803 A1 * | 8/2007 | Geiser | 180/215 |
| 2008/0100018 A1 * | 5/2008 | Dieziger | 280/124.103 |
| 2008/0238005 A1 * | 10/2008 | James | 280/5.509 |

FOREIGN PATENT DOCUMENTS

| | | |
|---|---|---|
| EP | 1 318 069 A2 | 6/2003 |
| EP | 1 870 269 A1 | 12/2007 |
| JP | 58-188771 A | 11/1983 |
| JP | 59-179467 A | 10/1984 |
| JP | 2004-359232 A | 12/2004 |
| WO | 2004/011324 A1 | 2/2004 |

OTHER PUBLICATIONS

Official Communication issued in corresponding European Patent Application No. 09010191.6, mailed on Nov. 26, 2009.
Hara et al.; "Body Leaning Control System, and a Saddle Riding Type Vehicle Having the Same", U.S. Appl. No. 12/511,088, filed Jul. 29, 2009.

* cited by examiner

*Primary Examiner* — Toan To
(74) *Attorney, Agent, or Firm* — Keating & Bennett, LLP

(57) ABSTRACT

A body leaning control system includes a support mechanism arranged to support at least a pair of traveling members that contact a traveling surface and are provided at opposite sides of the vehicle body to be movable up and down relative to the vehicle body, a resistance applying mechanism arranged to apply to the support mechanism a resistance to up-and-down motions of the pair of wheels, a lean information detecting device arranged to detect information on a lean amount of the vehicle body, and a controller arranged to perform control, based on detection results received from the lean information detecting device, to set the resistance of the resistance applying mechanism to a first resistance when the lean amount of the vehicle body is increasing, and to set the resistance of the resistance applying mechanism to a second resistance smaller than the first resistance when the lean amount of the vehicle body is decreasing.

15 Claims, 17 Drawing Sheets

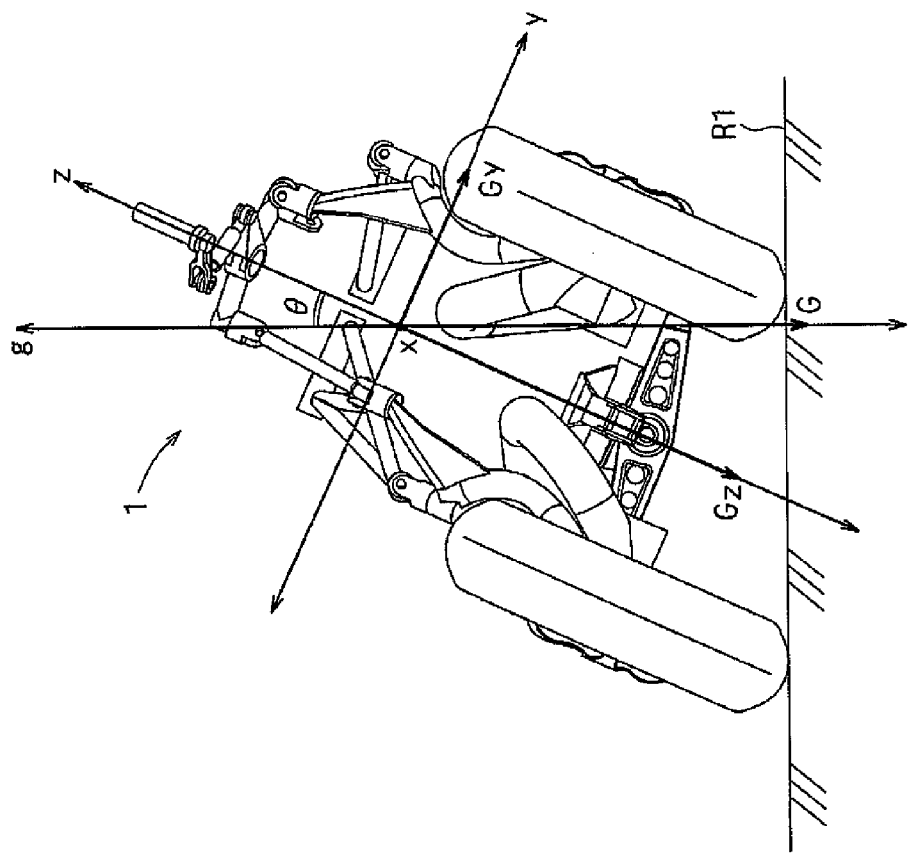
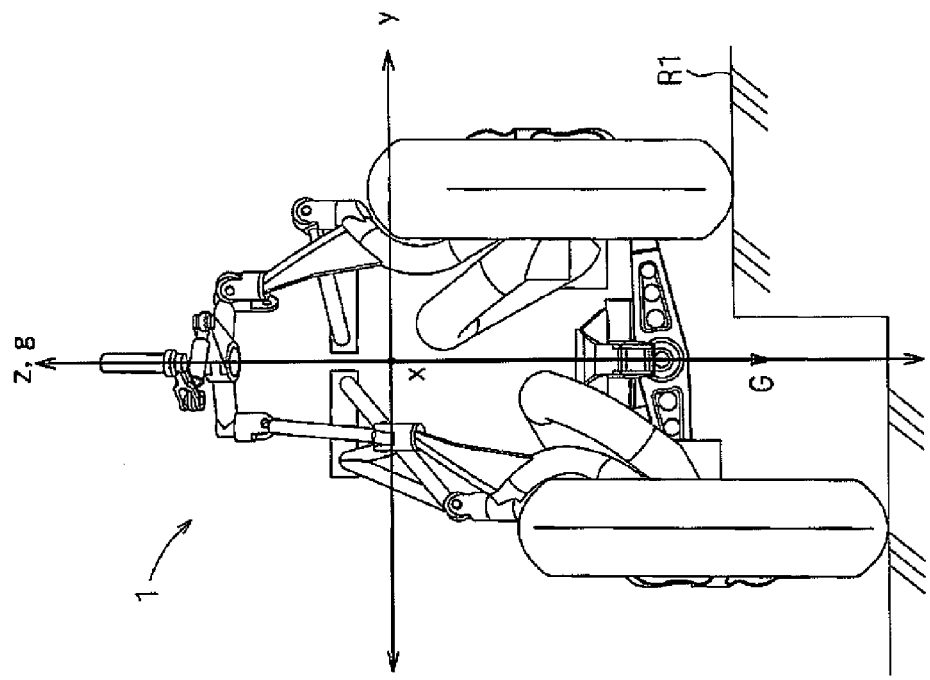
FIG. 10B
FIG. 10A

BODY LEANING CONTROL SYSTEM, AND A SADDLE RIDING TYPE VEHICLE HAVING THE SAME

BACKGROUND OF THE INVENTION

1. Field of the Invention

The present invention relates to a body leaning control system for use on a saddle riding type vehicle having a pair of traveling members at least at the front or rear portion of a vehicle body, which can make turns by leaning the vehicle body, and to a saddle riding type vehicle including such a body leaning control system.

2. Description of the Related Art

A saddle riding type vehicle has heretofore been proposed that has a pair of wheels (traveling members) arranged at both sides of the front portion and/or rear portion of the vehicle body, and a support mechanism for supporting at least one pair of wheels to be movable substantially up and down relative to the vehicle body. The saddle riding type vehicle constructed in this way can make turns by leaning the vehicle body as does a motorcycle (as disclosed in Japanese Unexamined Patent Publication No. 2004-359232, Japanese Unexamined Patent Publication S59-179467 and Japanese Unexamined Patent Publication S58-188771, for example).

Japanese Unexamined Patent Publication No. 2004-359232 discloses a three-wheeled automotive vehicle having a pair of wheels provided at the front of a vehicle body. A support mechanism supporting the pair of wheels includes a group of rolls held to form a shape of an articulated square by two crossbars arranged vertically and rotatably supported at the forward end of a main frame, a right side tube connected to right ends of both crossbars, and a left side tube connected to left ends of both crossbars. The pair of right and left tubes rotatably support the pair of wheels. The support mechanism constructed in this way supports the pair of wheels to be movable up and down relative to the vehicle body. Thus, the vehicle disclosed in Japanese Unexamined Patent Publication No. 2004-359232 can make turns while leaning the main frame with the pair of wheels contacting the traveling surface.

Japanese Unexamined Patent Publication S59-179467 and Japanese Unexamined Patent Publication S58-188771 each disclose a three-wheeled automotive vehicle having a pair of wheels at the rear of a vehicle body. The pair of wheels are rockably supported by a main frame. The vehicle further includes a device for limiting rocking of the pair of wheels, and a device for detecting vehicle speed, for limiting the rocking when the vehicle speed falls to a certain fixed speed. This stabilizes the position of the vehicle body when stopping, for example.

However, the conventional vehicles with such constructions have the following drawbacks and disadvantages.

With the conventional constructions, the rocking is limited when the vehicle speed falls to a fixed speed, and whether to carry out the rocking limitation is not related to variations in a lean amount of the vehicle body. Therefore, the rocking may be limited when the rider is returning the vehicle body to a neutral position. Then, it is impossible or difficult to return the vehicle body to the neutral position, resulting in an inconvenience that the rider cannot run comfortably.

SUMMARY OF THE INVENTION

In view of the above, preferred embodiments of the present invention provide a body leaning control system and a saddle riding type vehicle including such a body leaning control system, in which the vehicle has at least a pair of traveling members, and a vehicle body can easily return to a neutral position while limiting leaning of the vehicle body.

According to a preferred embodiment of the present invention, a body leaning control system for a saddle riding type vehicle capable of making turns by leaning a vehicle body preferably includes a support mechanism arranged to support at least a pair of traveling members that contact a traveling surface and are provided at opposite sides of the vehicle body to be movable up and down relative to the vehicle body; a resistance applying mechanism arranged to apply to the support mechanism a resistance to up-and-down motions of the pair of traveling members; a lean information detecting device arranged to detect information on a lean amount of the vehicle body; and a controller arranged to perform control, based on detection results received from the lean information detecting device, to set the resistance of the resistance applying mechanism to a first resistance when the lean amount of the vehicle body is increasing, and to set the resistance of the resistance applying mechanism to a second resistance smaller than the first resistance when the lean amount of the vehicle body is decreasing.

According to a preferred embodiment of the present invention, the support mechanism is preferably arranged to support a pair of traveling members to be movable up and down relative to the vehicle body. Thus, the vehicle body can be leaned with the pair of traveling members both contacting the traveling surface. The vehicle can therefore run by leaning the vehicle body at a time of making a turn, for example. The controller controls the resistance applying mechanism based on detection results received from the lean information detecting device which detects information on a lean amount of the vehicle body. Specifically, the controller sets as a first resistance, the resistance applied by the resistance applying mechanism to the support mechanism when the lean amount of the vehicle body is increasing. When the lean amount of the vehicle body is decreasing, the controller sets the resistance applied by the resistance applying mechanism to the support mechanism, to a second resistance that is smaller than the first resistance.

The resistance applying mechanism applies the first resistance and second resistance to the support mechanism under control of the controller. When the relatively strong, first resistance is applied to the support mechanism, it becomes relatively difficult for the pair of traveling members to move up and down, thereby inhibiting a further increase in the lean amount of the vehicle body. This can reduce the burden of the rider for returning the vehicle body to a neutral position. When the relatively weak, second resistance is applied to the support mechanism, it becomes relatively easy for the pair of traveling members to move up and down, thereby presenting a relatively small obstruction to a further decrease in the lean amount of the vehicle body. This allows the rider to return the vehicle body to the neutral position relatively easily.

Here, the "saddle riding type vehicle" may preferably include, besides a vehicle driven by the rider straddling the saddle, a scooter type vehicle driven by the rider seated with his or her legs close together. The "saddle riding type vehicle" may preferably include a three-wheeled automotive vehicle and a four-wheeled automotive vehicle whose traveling members are wheels, and a snowmobile whose traveling members are skis. The "vehicle body" refers to a main frame and components fixed to be integral therewith. The "lean amount of the vehicle body" is a degree of a lean angle of the vehicle body, which always has a positive value.

It is preferred that the second resistance has a substantially minimum value of the resistance of the resistance applying mechanism. Then, the vehicle body can be returned to the neutral position very easily.

It is preferred that the lean amount of the vehicle body is a degree of an angle at which the vehicle body leans sideways relative to a substantially vertical direction. Then, the lean amount of the vehicle body can be determined accurately regardless of traveling surface conditions, for example.

It is preferred that a decrease in the lean amount of the vehicle body is a variation of the lean amount toward a neutral position where an up-and-down direction of the vehicle body is parallel to a substantially vertical direction; and an increase in the lean amount of the vehicle body is a variation of the lean amount away from the neutral position. This enables an accurate determination, regardless of traveling surface conditions, whether a change in position of the vehicle body is a time variation for returning to the neutral position, or a time variation for moving away from the neutral position (variation in a direction to topple the vehicle body).

It is preferred that the controller is arranged to perform control, based on the detection results received from the lean information detecting device, to set the first resistance to include a region where the first resistance increases with the lean amount of the vehicle body. This construction can effectively inhibit an excessive leaning of the vehicle body according to the lean amount of the vehicle body.

It is preferred that the controller is arranged to set the resistance of the resistance applying mechanism to the first resistance when the lean amount of the vehicle body is increasing and is larger than a first angle, and to set the resistance of the resistance applying mechanism to a third resistance smaller than the first resistance when the lean amount of the vehicle body is increasing and is at the first angle or less. The controller sets the resistance that the resistance applying mechanism applies to the support mechanism to the first resistance when the lean amount of the vehicle body is increasing and is larger than the first angle. This can lighten the load of the rider for returning the vehicle body to the neutral position (more strictly, for reducing the lean amount of the vehicle body to the first angle or less). This can also inhibit in advance the lean amount of the vehicle body from exceeding the first angle.

It is preferred that the third resistance has a substantially minimum value of the resistance of the resistance applying mechanism. Then, it is possible not to prevent an increase in the lean amount of the vehicle body in a range where the lean amount is at the first angle and less.

It is preferred that the controller is arranged to set the resistance of the resistance applying mechanism to the first resistance when the lean amount of the vehicle body is increasing and is also at a first angle or less. The controller sets the first resistance uniformly, regardless of the lean amount of the vehicle body, when the lean amount of the vehicle body is increasing. This can reliably inhibit an increase in the lean amount of the vehicle body.

It is preferred that the system further includes a vehicle speed detecting device arranged to detect a vehicle speed, wherein the controller is arranged to set a first angle based on a detection result received from the vehicle speed detecting device. Since the controller sets the first angle according to a vehicle speed, the timing of applying the first resistance to the support mechanism can be changed properly according to the vehicle speed.

It is preferred that the controller is arranged to set the first angle to include a region where the first angle increases with the vehicle speed. In an actual running situation, a range of the lean amount of the vehicle body enabling a comfortable run is considered to increase with the vehicle speed. And when the vehicle speed increases, the lean amount of the vehicle body to be inhibited is considered to increase also. According to a preferred embodiment the present invention, leaning of the vehicle body can be inhibited with appropriate timing in an actual running situation.

It is preferred that the system further includes a vehicle speed detecting device arranged to detect a vehicle speed, wherein the controller is arranged to perform control, based on detection results received from the vehicle speed detecting device, to set the first resistance to include a region where the first resistance decreases with an increase in the vehicle speed. When vehicle speed is relatively fast, centrifugal force is strong, and therefore an increase in the lean amount of the vehicle body can be inhibited appropriately even if the first resistance is relatively weak. When vehicle speed is relatively slow, centrifugal force is weak but the first resistance is relatively strong, and therefor an increase in the lean amount of the vehicle body can be inhibited appropriately. Generally, the slower the vehicle speed is, the greater effort of the rider is required to return the vehicle body to the neutral position. However, since the first resistance is set strong for a slow vehicle speed, the rider's effort can be reduced sufficiently. Thus, the rider can travel comfortably.

It is preferred that the controller is arranged to perform control, based on detection results received from the lean information detecting device, to set the first resistance to include a region where the first resistance increases with an angular speed of the lean amount which is a variation in the lean amount of the vehicle body. This construction can effectively inhibit the vehicle body from leaning to excess.

It is preferred that the support mechanism includes a right side support mechanism arranged to vertically movably support a right traveling member of the pair of traveling members; a left side support mechanism arranged to vertically movably support a left traveling member of the pair of traveling members; and a balancer mechanism rotatably supported by the vehicle body and interlocked to the right side support mechanism and the left side support mechanism to allow the right traveling member and the left traveling member to move up and down in corresponding amounts in opposite directions; and the resistance applying mechanism includes a damper body arranged to damp rotation of the balancer mechanism relative to the vehicle body; and an adjusting element arranged to vary a damping force of the damper body; and the controller is arranged to control a level of resistance applied to the rotation of the balancer mechanism by driving the adjusting element. Thus, the resistance applying mechanism can be constructed easily and conveniently.

It is preferred that the traveling members are wheels or skis, for example. Thus, the body leaning control system can be applied easily and conveniently to a saddle riding type vehicle having wheels or skis.

According to another preferred embodiment of the present invention, a saddle riding type vehicle includes a body leaning control system and capable of making turns by leaning a vehicle body, the body leaning control system including a support mechanism arranged to support at least a pair of traveling members that contact a traveling surface and are provided at opposite sides of the vehicle body to be movable up and down relative to the vehicle body; a resistance applying mechanism arranged to apply to the support mechanism a resistance to up-and-down motions of the pair of traveling members; a lean information detecting device arranged to detect information on a lean amount of the vehicle body; and a controller arranged to perform control, based on detection results received from the lean information detecting device, to set the resistance of the resistance applying mechanism to a first resistance when the lean amount of the vehicle body is increasing, and to set the resistance of the resistance applying mechanism to a second resistance smaller than the first resistance when the lean amount of the vehicle body is decreasing.

According to a preferred embodiment of the present invention, the rider can ride and run comfortably on the saddle riding type vehicle.

According to another preferred embodiment of the present invention, a body leaning control system for a saddle riding type vehicle capable of making turns by leaning a vehicle body, includes a support mechanism arranged to support at least a pair of traveling members that contact a traveling surface and are provided at opposite sides of the vehicle body to be movable up and down relative to the vehicle body; and a resistance applying mechanism arranged to apply to the support mechanism a resistance to up-and-down motions of the pair of traveling members; wherein the resistance of the resistance applying mechanism when a lean amount of the vehicle body is decreasing is weaker than the resistance of the resistance applying mechanism when the lean amount of the vehicle body is increasing and is larger than a first angle.

The support mechanism is preferably arranged to support a pair of traveling members to be movable up and down relative to the vehicle body. Thus, the vehicle body can be leaned with the pair of traveling members both contacting the traveling surface. The vehicle can therefore run by leaning the vehicle body at a time of making a turn, for example. The resistance applying mechanism applies resistance to the support mechanism to act against up-and-down motions of the pair of traveling members. Here, the resistance when the lean amount of the vehicle body is decreasing is weaker than the resistance when the lean amount of the vehicle body is increasing and is larger than the first angle. Consequently, when the lean amount of the vehicle body is increasing in excess of the first angle, it becomes relatively difficult for the pair of traveling members to move up and down, thereby inhibiting a further increase in the lean amount the vehicle body. When the lean amount of the vehicle body is decreasing, it becomes relatively easy for the pair of traveling members to move up and down, thereby presenting a relatively small obstruction to a further decrease in the lean amount the vehicle body. This allows the rider to return the vehicle body to the neutral position relatively easily.

The lean amount of the vehicle body preferably is an absolute value of an angle to which the vehicle body having rotated about an axis extending longitudinally of the vehicle body from a neutral position where an up-and-down direction of the vehicle body is parallel to a substantially vertical direction. Thus, the lean amount of the vehicle body can be determined accurately regardless of traveling surface conditions, for example.

A decrease in the lean amount of the vehicle body preferably is a variation in the lean amount where the vehicle body returns to the neutral position, and an increase in the lean amount of the vehicle body preferably is a variation in the lean amount where the vehicle body moves away from the neutral position. As a result, an accurate determination can be made, regardless of traveling surface conditions, whether a change in position of the vehicle body is a variation for returning to the neutral position, or a variation for moving away from the neutral position (variation in a direction to topple the vehicle body).

The lean information detecting device preferably is arranged to detect at least one of a lean amount of the vehicle body and an angular speed of the lean amount which is a variation in the lean amount of the vehicle body. Thus, the controller can set the first resistance and/or the first angle appropriately according to a position of the vehicle body.

The controller preferably is arranged to set the first resistance to increase with the lean amount of the vehicle body over an entire range of the lean amount.

The controller is also preferably arranged to set the first resistance to include a region where the first resistance increases with the lean amount of the vehicle body, and such that the first resistance is fixed despite an increase in the lean amount of the vehicle body except in the region where the first resistance increases with the lean amount of the vehicle body.

As a result, the first resistance appropriately adapted to an actual traveling situation can be set.

The first angle preferably has a substantially upper limit value of the lean amount of the vehicle body for permitting the rider to decrease the lean amount of the vehicle body easily. Thus, it is possible to inhibit the vehicle body from leaning to such an excessive degree as to impair a comfortable run.

The third resistance preferably is at least as strong as the second resistance. Thus, it is possible to inhibit an increase in the lean amount of the vehicle body relatively effectively even when the lean amount of the vehicle body is at the first angle or less.

Preferably, the first angle has a fixed value so that the processing performed by the controller can be simplified.

The controller preferably is arranged to set the first angle to increase with the vehicle speed over an entire range of vehicle speed.

The controller preferably is also arranged to set the first angle to be fixed despite an increase in the vehicle speed except in the region where the first angle increases with the vehicle speed.

Thus, the controller can set the first angle appropriately adapted to an actual traveling situation.

The controller preferably is arranged to set the first resistance to decrease with an increase in the vehicle speed over an entire range of vehicle speed.

The controller also is preferably arranged to set the first resistance to include a region where the first resistance decreases with an increase in the vehicle speed, and such that the first resistance is fixed despite an increase in the vehicle speed except in the region where the first resistance decreases with an increase in the vehicle speed.

Thus, it is possible to set the first resistance appropriately adapted to an actual traveling situation.

The first resistance preferably increases with the angular speed of the lean amount of the vehicle body. As a result, the vehicle body can be effectively inhibited from leaning to excess.

The resistance applying mechanism is preferably controllable such that the first resistance increases with the angular speed of the lean amount of the vehicle body, or the resistance applying mechanism preferably has such a characteristic that the first resistance increases with the angular speed of the lean amount of the vehicle body. The latter resistance applying mechanism may be a damper body, for example.

The controller preferably is arranged to set the first resistance to increase with the angular speed of the lean amount over an entire range of angular speed of the lean amount.

The controller preferably is also arranged to set the first resistance to include a region where the first resistance increases with the angular speed of the lean amount, and such that the first resistance is fixed despite an increase in the angular speed of the lean amount except in the region where the first resistance increases with the angular speed of the lean amount.

As a result, the first resistance appropriately adapted to an actual traveling situation can be set.

The controller preferably is arranged to perform, based on detection results received from the lean information detecting device, to set the first resistance to include a region where the first resistance increases with an angular speed of the lean amount which is a variation in the lean amount of the vehicle body when the lean amount of the vehicle body is fixed, and such that the first resistance increases with the lean amount of the vehicle body when the angular speed of the lean amount is fixed. Thus, the first resistance appropriately adapted to an actual traveling situation can be set.

The body leaning control system preferably also includes a vehicle speed detecting device arranged to detect a vehicle speed, wherein the controller is arranged to perform, based on detection results from the lean information detecting device and the vehicle speed detecting device, to set the first resistance such that the first resistance increases with the angular speed of the lean amount when the vehicle speed is fixed, and that the first resistance decreases with an increase in the vehicle speed when the angular speed of the lean amount is fixed.

Thus, the first resistance appropriately adapted to an actual traveling situation can be set.

The body leaning control system preferably also includes a vehicle speed detecting device arranged to detect a vehicle speed, wherein the controller is arranged to perform control, based on detection results from the lean information detecting device and the vehicle speed detecting device, to set the first resistance such that the first resistance increases with the angular speed of the lean amount when the lean amount of the vehicle body and the vehicle speed are fixed, such that the first resistance decreases with an increase in the vehicle speed when the lean amount of the vehicle body and the angular speed of the lean amount are fixed, and such that the first resistance increases with the lean amount of the vehicle body when the angular speed of the lean amount and the vehicle speed are fixed.

Thus, the first resistance appropriately adapted to an actual traveling situation can be set.

The damper body preferably is a rotary type attached to a rotary shaft of the balancer mechanism so that the damper body can be constructed easily and conveniently.

The support mechanism preferably includes a right swing arm rotatable relative to the vehicle body about an axis extending transversely of the vehicle body to move up and down a right traveling member of the pair of traveling members, and a left swing arm rotatable relative to the vehicle body about the axis extending transversely of the vehicle body to move up and down a left traveling member of the pair of traveling members; the resistance applying mechanism includes a pair of cylinder type damper bodies arranged between the right swing arm and the vehicle body and between the left swing arm and the vehicle body, to damp each rotation of the right swing arm and the left swing arm, an adjusting element arranged to interlock amounts of extension and contraction of the pair of cylinder type damper bodies so that up-and-down motions of the right traveling member and the left traveling member take place in opposite directions and in corresponding amounts, and to vary resistance of each of the cylinder type damper bodies; and the controller is arranged to control the strength of the resistance to each rotation of the right swing arm and the left swing arm by driving the adjusting element. As a result, the resistance applying mechanism can be constructed easily and conveniently.

The resistance applying mechanism preferably includes a first member and a second member movable relative to each other, a working fluid for damping relative movement between the first member and the second member, an adjusting element arranged to vary a damping force of the working fluid, one of the first member and the second member being connected to the vehicle body, and the other of the first member and the second member being connected to the pair of traveling members; and the controller is arranged to control the strength of the resistance of the resistance applying mechanism by driving the adjusting element. Thus, the adjusting element is arranged to vary at least one of flow resistance and viscosity of the working fluid.

The working fluid preferably is hydraulic oil or a magnetic fluid. The first member and the second member preferably are a rotary type rotatable relative to each other about a common axis. As a result, the resistance applying mechanism can be constructed easily and conveniently.

The support mechanism preferably supports a pair of traveling members arranged at a front portion of the vehicle body, and a pair of traveling members arranged at a rear portion of the vehicle body, to be movable up and down relative to the vehicle body, respectively, and the resistance applying mechanism is arranged to apply a resistance to the support mechanism connected to one of the pairs of traveling members at the front portion and the rear portion of the vehicle body.

Thus, even where the support mechanism supports two pairs of traveling members provided at the front and rear of the vehicle body, respectively, the construction can be simplified since the resistance applying mechanism is constructed to apply resistance to the up-and-down motions of one pair of traveling members provided at the front or rear portion.

According to another preferred embodiment of the present invention, a body leaning control system for a saddle riding type vehicle capable of making turns by leaning a vehicle body, includes a support mechanism arranged to support at least a pair of traveling members that contact a traveling surface and are provided at opposite sides of the vehicle body to be movable up and down relative to the vehicle body; a resistance applying mechanism arranged to apply to the support mechanism a resistance to up-and-down motions of the pair of traveling members; a lean information detecting device arranged to detect information on a lean amount of the vehicle body; and a controller arranged to perform control, based on detection results received from the lean information detecting device, to set the resistance of the resistance applying mechanism to a first resistance when the lean amount of the vehicle body is increasing and is larger than a first angle, and to set the resistance of the resistance applying mechanism to a second resistance smaller than the first resistance when the lean amount of the vehicle body is decreasing.

The support mechanism is arranged to allow the vehicle to run by leaning the vehicle body at a time of making a turn, for example. The controller controls the resistance applying mechanism based on detection results received from the lean information detecting device. Specifically, the controller sets as a first resistance, the resistance that is applied by the resistance applying mechanism to the support mechanism when the lean amount of the vehicle body is increasing and is larger than the first angle. When the lean amount of the vehicle body is decreasing, the controller sets the resistance applied by the resistance applying mechanism to the support mechanism, to a second resistance smaller than the first resistance.

The resistance applying mechanism applies the first resistance and second resistance to the support mechanism under control of the controller. When the relatively strong, first resistance is applied to the support mechanism, it becomes relatively difficult for the pair of traveling members to move up and down, thereby inhibiting a further increase in the lean amount the vehicle body. This can reduce the burden of the rider for returning the vehicle body to a neutral position (more strictly, for reducing the lean amount of the vehicle body to the first angle or less). When the relatively weak, second resistance is applied to the support mechanism, it becomes relatively easy for the pair of traveling members to move up and down, thereby presenting a relatively small obstruction to a further decrease in the lean amount the vehicle body. This allows the rider to return the vehicle body to the neutral position relatively easily.

According to yet another preferred embodiment of the present invention, a saddle riding type vehicle includes a body leaning control system and capable of making turns by leaning a vehicle body, the body leaning control system including a support mechanism arranged to support at least a pair of traveling members that contact a traveling surface and are provided at opposite sides of the vehicle body to be movable up and down relative to the vehicle body; a resistance applying mechanism arranged to apply to the support mechanism a resistance to up-and-down motions of the pair of traveling members; a lean information detecting device arranged to detect information on a lean amount of the vehicle body; and a controller arranged to perform control, based on detection results received from the lean information detecting device, to set the resistance of the resistance applying mechanism to a first resistance when the lean amount of the vehicle body increasing and is larger than a first angle, and to set the resistance of the resistance applying mechanism to a second resistance smaller than the first resistance when the lean amount of the vehicle body is decreasing.

According to this and other various preferred embodiments of the present invention, the rider can ride and run comfortably on the saddle riding type vehicle.

Other features, elements, steps, characteristics and advantages of the present invention will become more apparent from the following detailed description of preferred embodiments of the present invention with reference to the attached drawings.

BRIEF DESCRIPTION OF THE DRAWINGS

For the purpose of illustrating the invention, there are shown in the drawings several forms which are presently preferred, it being understood, however, that the present invention is not limited to the precise arrangement and instrumentalities shown.

FIG. 10A is a view showing a leaning angle of a vehicle body.

FIG. 10B is a view showing a leaning angle of the vehicle body.

DETAILED DESCRIPTION OF PREFERRED EMBODIMENTS

Preferred embodiments of the present invention will be described in detail hereinafter with reference to the drawings.

Figure 1:
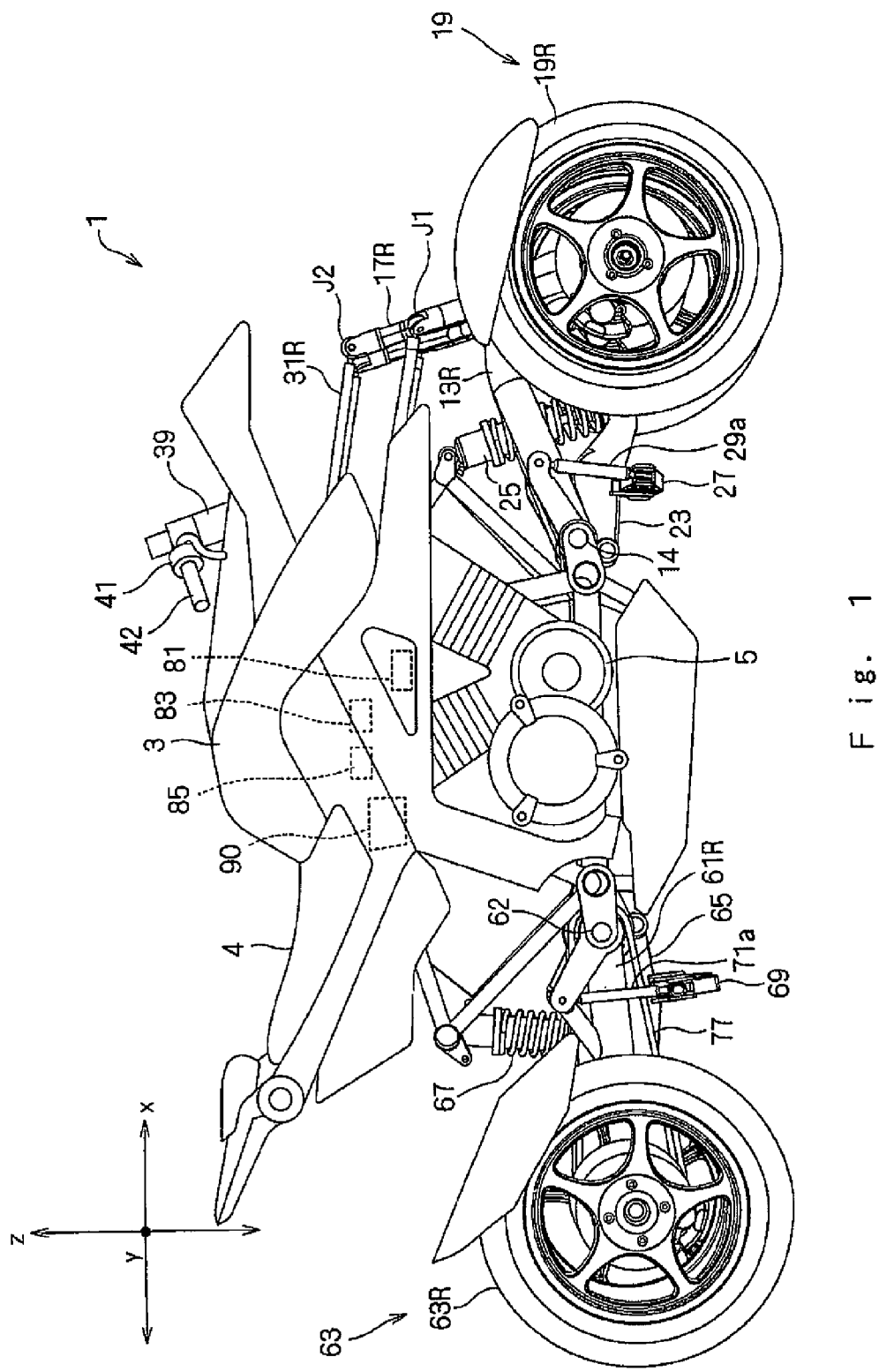
FIG. 1 is a side view showing an outward appearance of a saddle riding type vehicle according to a preferred embodiment of the present invention.
Figure 2:
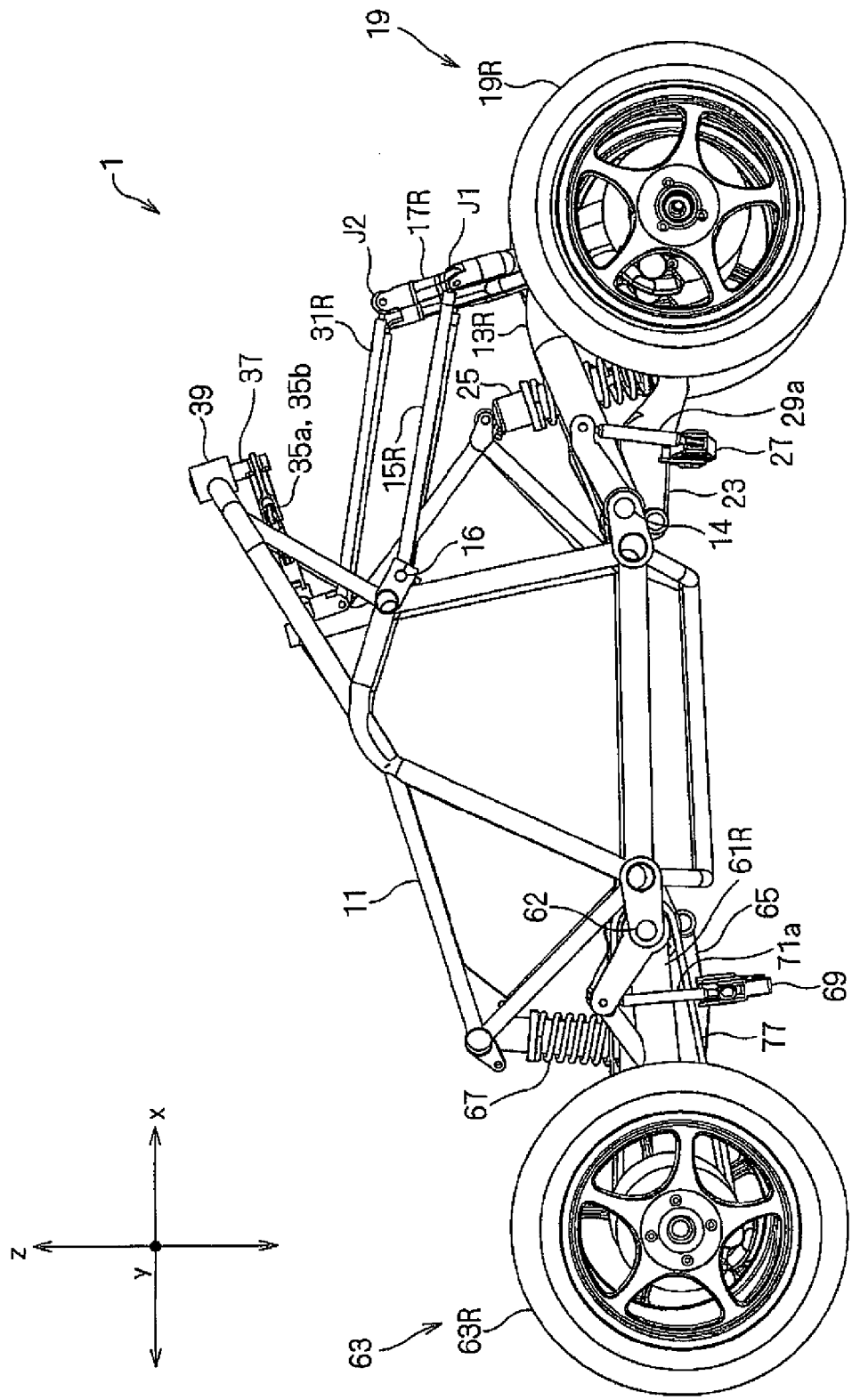
FIG. 2 is a side view showing an outline construction of the saddle riding type vehicle according to a preferred embodiment of the present invention.
Figure 3:
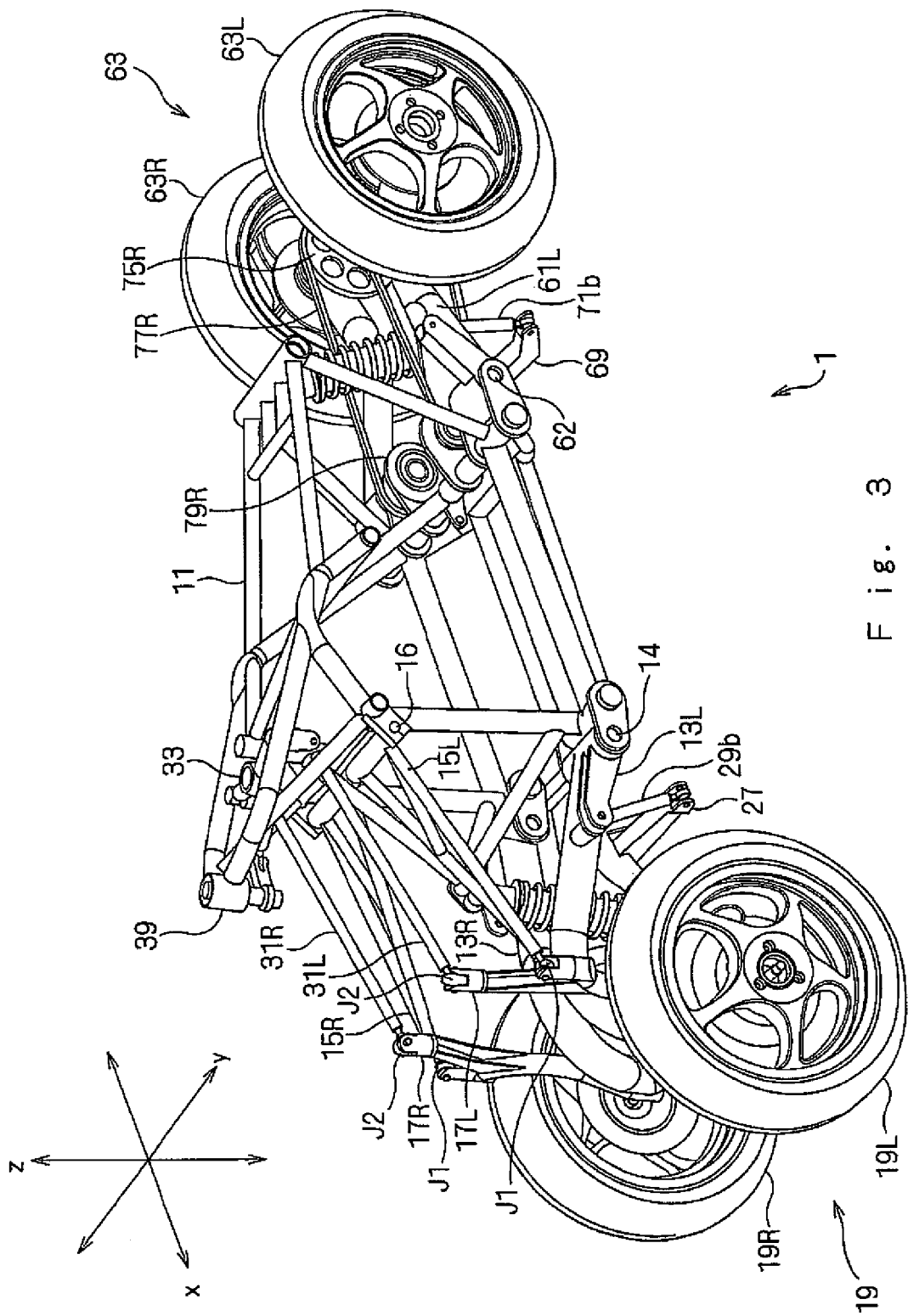
FIG. 3 is a perspective view showing an outline construction of the saddle riding type vehicle according to a preferred embodiment of the present invention.
Figure 4:
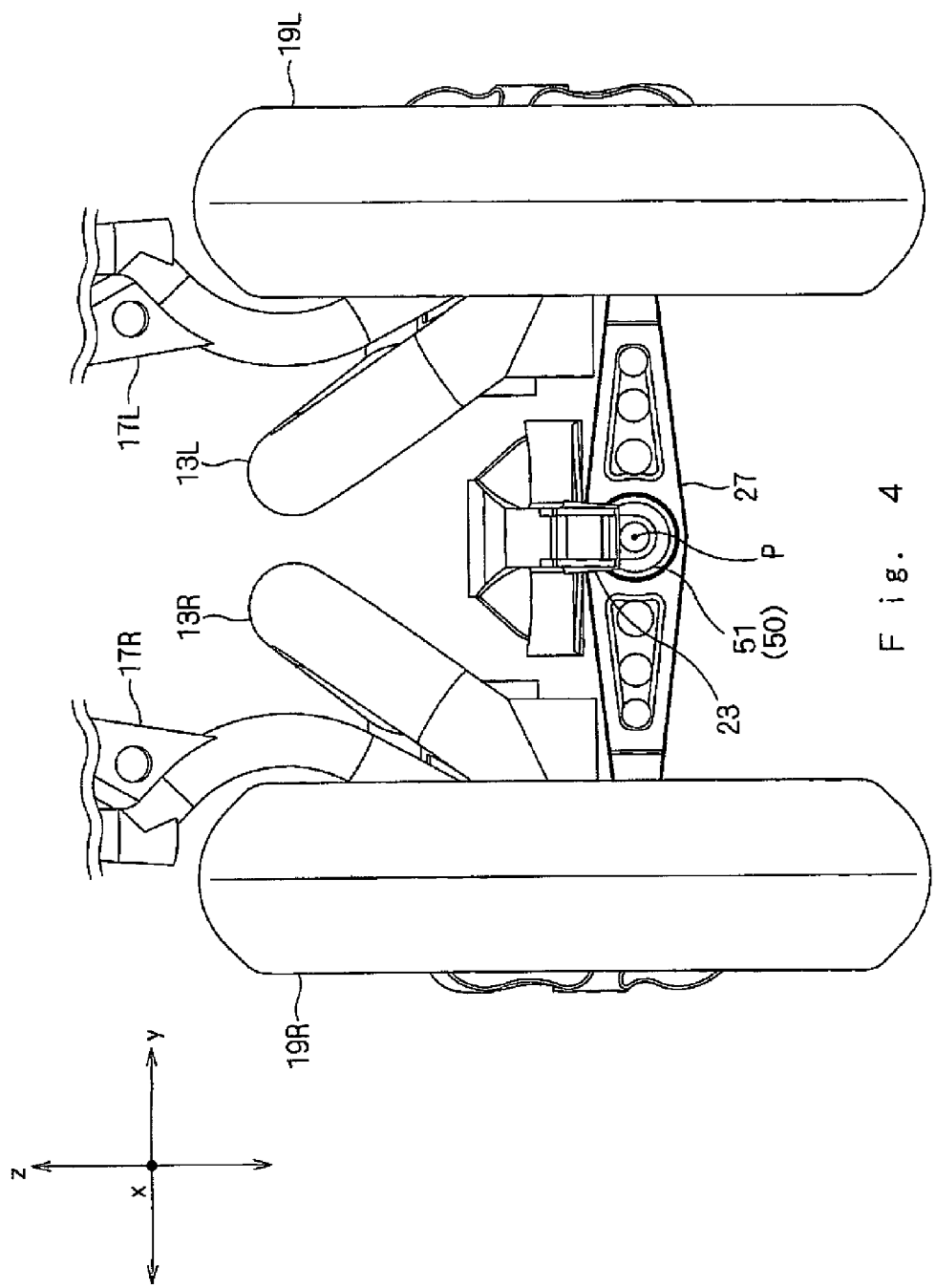
FIG. 4 is a front view of a principal portion of the saddle riding type vehicle.
Figure 5:
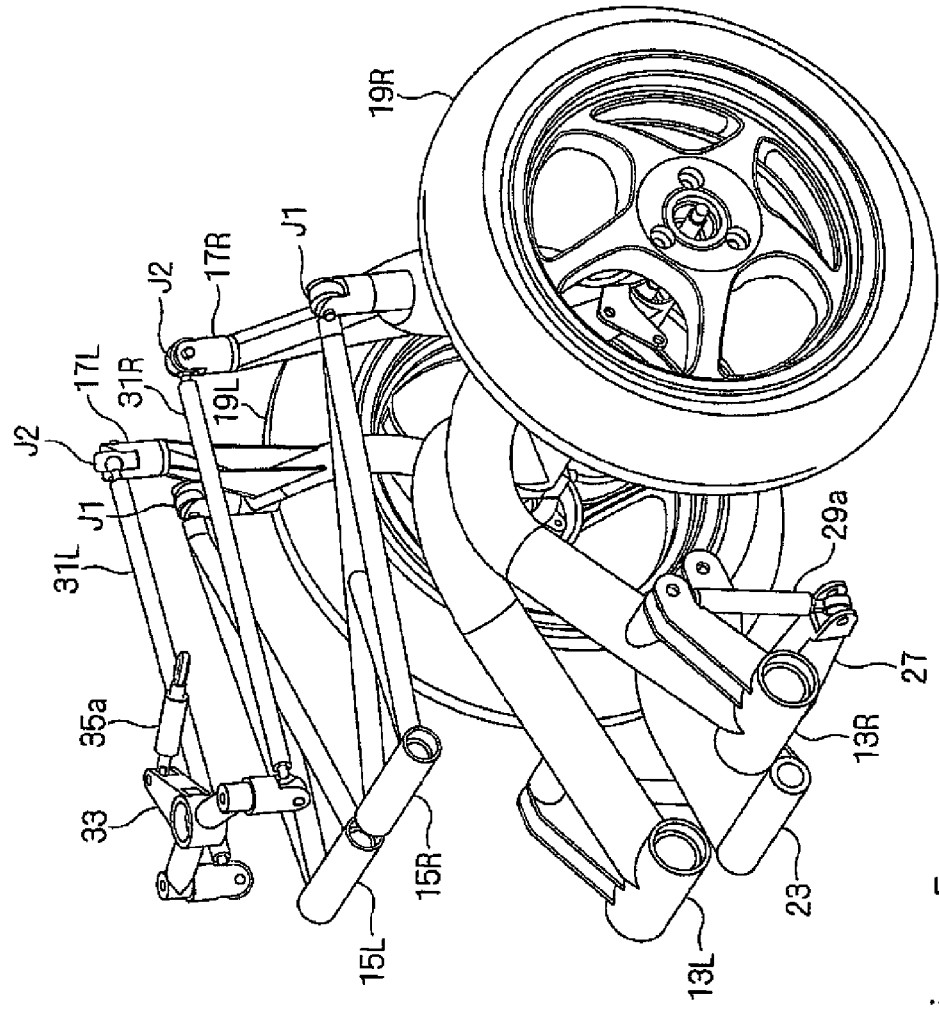
FIG. 5 is a perspective view showing the principal portion of the saddle riding type vehicle.
Figure 5:
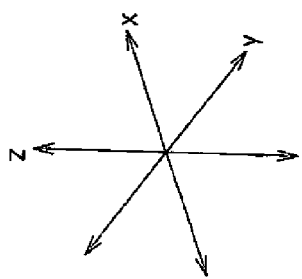

FIG. 1 is a side view showing an outward appearance of a saddle riding type vehicle according to a preferred embodiment of the present invention. FIG. 2 is a side view showing an outline construction of the saddle riding type vehicle. FIG. 3 is a perspective view showing an outline construction of the saddle riding type vehicle. FIG. 4 is a front view of a principal portion of the saddle riding type vehicle. FIG. 5 is a perspective view of the principal portion of the saddle riding type vehicle. As used in the following description, the "right" and "left" refer to the sides seen from the rider seated on the saddle riding type vehicle. In FIGS. 1 and 2, the right side of the drawings corresponds to the front of the saddle riding type vehicle 1. In FIG. 3, the left side of the drawing corresponds to the front of the saddle riding type vehicle 1.

Referring mainly to FIGS. 1 through 3, the saddle riding type vehicle 1 in this preferred embodiment preferably is an automotive four-wheeled vehicle having pairs of wheels at the front and rear of a vehicle body, respectively. The saddle riding type vehicle 1 has a main frame 11 with a down tube and a seat frame. The main frame 11 includes a head pipe 39 attached to a forward end thereof. The head pipe 39 rotatably supports a steering shaft 37. A handlebar 41 is attached to the upper end of the steering shaft 37. A fuel tank 3 is mounted on the main frame 11 rearward of the handlebar 41, and a seat 4 is mounted in a further rearward position. An engine 5 is mounted on the main frame 11 below the fuel tank 3.

In the following description, this main frame 11 and components (e.g. the seat 4) rigidly secured to the main frame 11 will be referred to as a "vehicle body" where appropriate. In the drawings, the x-direction is the longitudinal direction of the vehicle body, the y-direction is the transverse direction of the vehicle body, and the z-direction is the up-and-down direction of the vehicle body. The longitudinal direction, transverse direction and up-and-down direction of the vehicle body are perpendicular to one another. When the vehicle body stands upright, the longitudinal direction and transverse direction of the vehicle body are horizontal, respectively, and the up-and-down direction of the vehicle body is vertical.

Construction Relating to the Front Wheels

1. Support Mechanisms—Right Side and Left Side Support Mechanisms

Referring to FIG. 3, the main frame 11 has, attached to lower front positions thereof, a lower right swing arm 13R and a lower left swing arm 13L arranged transversely and extending forward of the vehicle body. Similarly, the main frame 11 has, attached to upper front positions thereof, an upper right swing arm 15R and an upper left swing arm 15L arranged transversely and extending forward of the vehicle body. One end of each of the lower right swing arm 13R and lower left swing arm 13L is supported by the main frame 11 to be rotatable about a lower pivot shaft 14. One end of each of the upper right swing arm 15R and upper left swing arm 15L is supported by the main frame 11 to be rotatable about an upper pivot shaft 16. The lower pivot shaft 14 and upper pivot shaft 16 extend substantially parallel to the transverse direction, respectively.

A right front tube 17R is connected to the other end of the lower right swing arm 13R. The right front tube 17R extends obliquely upward, and is in a substantially middle position thereof connected to the other end of the upper right swing arm 15R. A right wheel 19R is rotatably supported by a lower portion of the right front tube 17R. The construction is selected and designed such that joints at which the right front tube 17R is connected to the lower right swing arm 13R and upper right swing arm 15R, respectively, and positions of the lower pivot shaft 14 and upper pivot shaft 16, substantially correspond to the vertexes of a parallelogram in side view.

With the lower right swing arm 13R and upper right swing arm 15R rotating in forward and reverse directions about the lower pivot shaft 14 and upper pivot shaft 16, respectively, the right front tube 17R moves substantially up and down along the vehicle body. Consequently, the right wheel 19R moves up and down relative to the vehicle body.

A left front tube 17L and a left wheel 19L are constructed similarly to the right front tube 17R and right wheel 19R. The right wheel 19R and left wheel 19L arranged at opposite sides of the vehicle body as described above will be called collectively hereinafter the "right and left wheels 19" or the "pair of wheels" where appropriate. The right and left wheels 19 (right wheel 19R and left wheel 19L) correspond to the traveling members according to a preferred embodiment of the present invention.

Figure 6:
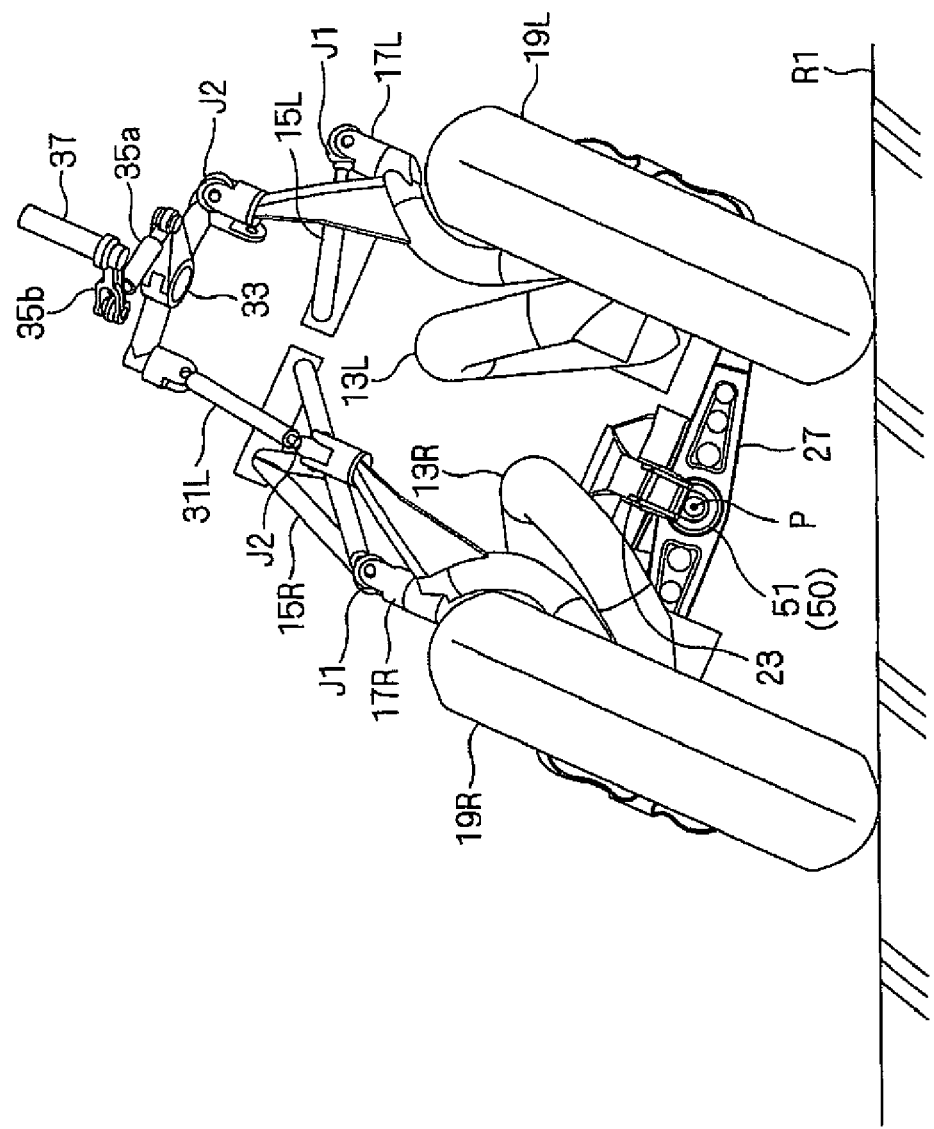
FIG. 6 is a front view of the principal portion showing a leaning state of the saddle riding type vehicle.
Figure 7:
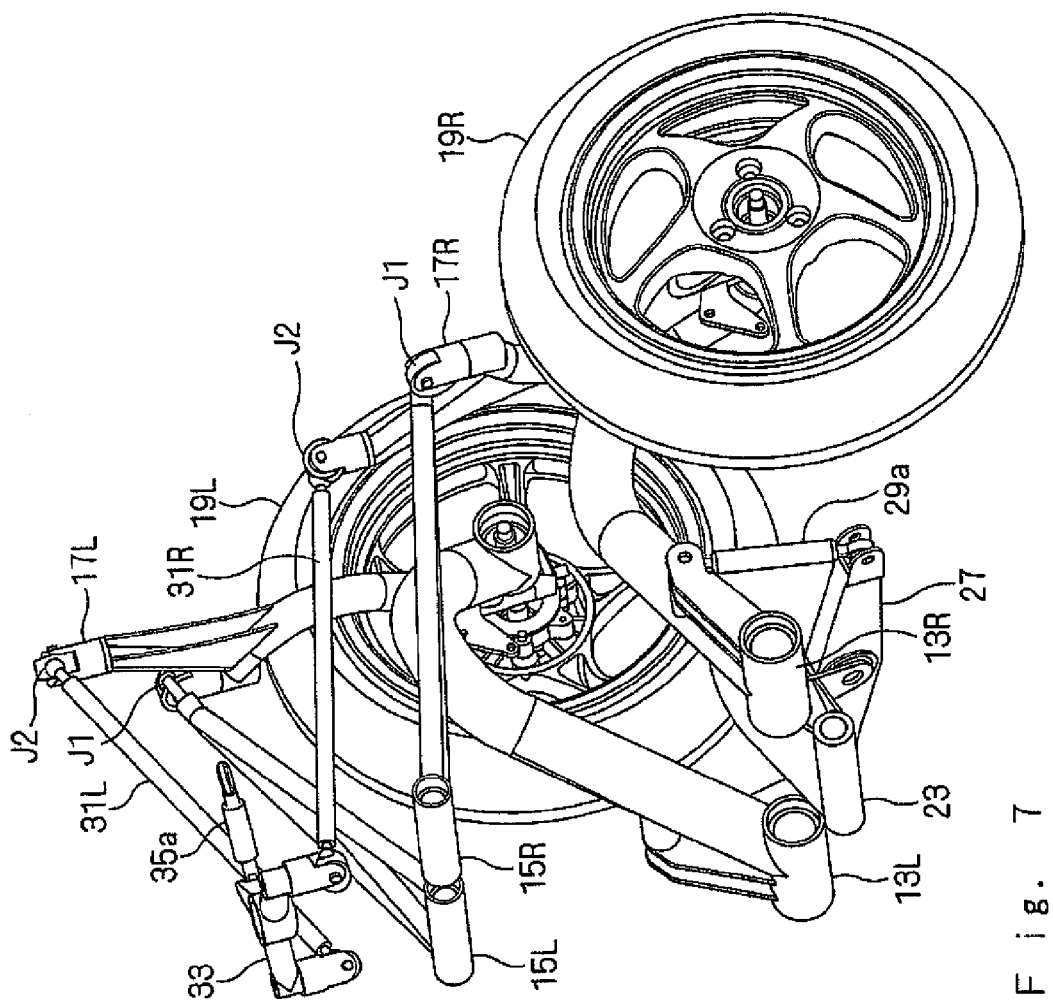
FIG. 7 is a perspective view of the principal portion showing the leaning state of the saddle riding type vehicle.
Figure 7:
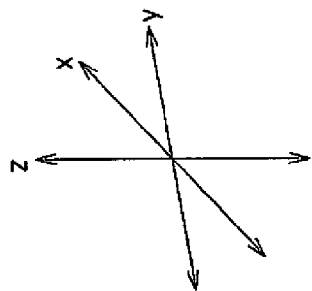

FIG. 6 is a front view of the principal portion showing a leaning state of the saddle riding type vehicle 1. FIG. 7 is a perspective view of the principal portion showing the leaning state of the saddle riding type vehicle 1. As shown, when the saddle riding type vehicle 1 is leaned to the left side in a traveling direction relative to a flat traveling surface R1, the right wheel 19R lowers relative to the vehicle body, and the left wheel 19L rises relative to the vehicle body, whereby the right wheel 19R and left wheel 19L are maintained in contact with the traveling surface R1, respectively. With a forward movement (onward from the plane of FIG. 6) in the state of the pair of right wheel 19R and left wheel 19L contacting the traveling surface R1, the saddle riding type vehicle 1 will turn left (rightward in FIG. 6).

The lower right swing arm 13R, upper right swing arm 15R and right front tube 17R correspond to the right side support mechanism according to a preferred embodiment of the present invention. The lower left swing arm 13L, upper left swing arm 15L and left front tube 17L correspond to the left side support mechanism according to a preferred embodiment of the present invention.

2. Support Mechanism—Balancer Mechanism

Referring mainly to FIG. 4, between and slightly below the lower right swing arm 13R and lower left swing arm 13L, a front carrier beam 23 is integrally supported by the main frame 11 to extend forward of the vehicle body. The front carrier beam 23 is further connected through a front suspension 25 to a central portion at the forward end of the main frame 11. The front carrier beam 23 supports a front balancer beam 27 to be rotatable about a shaft (hereinafter referred to as the "rotary shaft" where appropriate) extending substantially longitudinally of the vehicle body. A damper body 51, to be described hereinafter, is provided on the rotary shaft connecting the front carrier beam 23 and front balancer beam 27.

As shown in FIG. 5, the front balancer beam 27 extends transversely of the vehicle body, and has lower ends of rods 29*a* and 29*b* pivotably connected to opposite ends thereof. The upper ends of the rods 29*a* and 29*b* are pivotably connected to substantially middle positions of the lower right swing arm 13R and lower left swing arm 13L.

When, for example, the lower right swing arm 13R rotates about the lower pivot shaft 14 to lower the right wheel 19R and depress the rod 29*a*, the front balancer beam 27 rotates to raise the other rod 29*b* and push up the lower left swing arm 13L. As a result, the left wheel 19L moves up by an amount corresponding to the descent of the right wheel 19R. Thus, the right wheel 19R and left wheel 19L move up and down in equal amounts in substantially opposite directions relative to the vehicle body.

The front carrier beam 23, front suspension 25, front balancer beam 27 and rods 29*a* and 29*b* correspond to the balancer mechanism according to a preferred embodiment of the present invention. The right side support mechanism, left side support mechanism and balancer mechanism associated with the right and left wheels 19 at the front of the vehicle body noted above correspond to the support mechanism according to a preferred embodiment of the present invention.

3. Steering Mechanism

Referring to FIGS. 5 and 7, a ball joint J1 is preferably used as each of the joint between the right front tube 17R and lower right swing arm 13R and the joint between the right front tube 17R and upper right swing arm 15R. The ball joint J1 coupling the right front tube 17R and lower right swing arm 13R is not shown in the drawings. Thus, the right front tube 17R is supported by the lower right swing arm 13R and upper right swing arm 15R to be rotatable about an axis extending through the upper and lower joints.

Further, the right front tube 17R has a right steering rod 31R interlocked thereto. The right steering rod 31R is connected to the upper end of the right front tube 17R, which is offset from the axis extending through the joints noted above. A ball joint J2 is preferably used as the joint between the right front tube 17R and right steering rod 31R. The left front tube 17L and a left steering rod 31L interlocked thereto are arranged similarly to the above.

The other ends of the right steering rod 31R and left steering rod 31L are connected to a front bar 33, respectively. The front bar 33 has a central portion supported by the main frame 11 to be rotatable about an axis extending substantially vertically of the vehicle body, and two arms extending from this central portion substantially transversely of the vehicle body. The other ends of the right steering rod 31R and left steering rod 31L are connected to distal ends of these arms, respectively.

The front bar 33 further includes one arm extending from the central portion thereof obliquely forward of the vehicle body. This arm is connected to the lower end of the steering shaft 37 through link members 35a and 35b. The steering shaft 37 extends through, and is rotatably supported by, the head pipe 39 provided in an uppermost position at the forward end of the main frame 11. The handlebar 41 is fixed to the upper end of the steering shaft 37. The handlebar 41 includes an accelerator grip 42.

When the handlebar 41 is turned, the link members 35a and 35b will bend and stretch to rotate the front bar 33. As a result, the right steering rod 31R and left steering rod 31L move in opposite directions substantially longitudinally of the vehicle body. The right front tube 17R and left front tube 17L rotate to give a steering angle to the right wheel 19R and left wheel 19L.

4. Resistance Applying Mechanism

Figure 8:
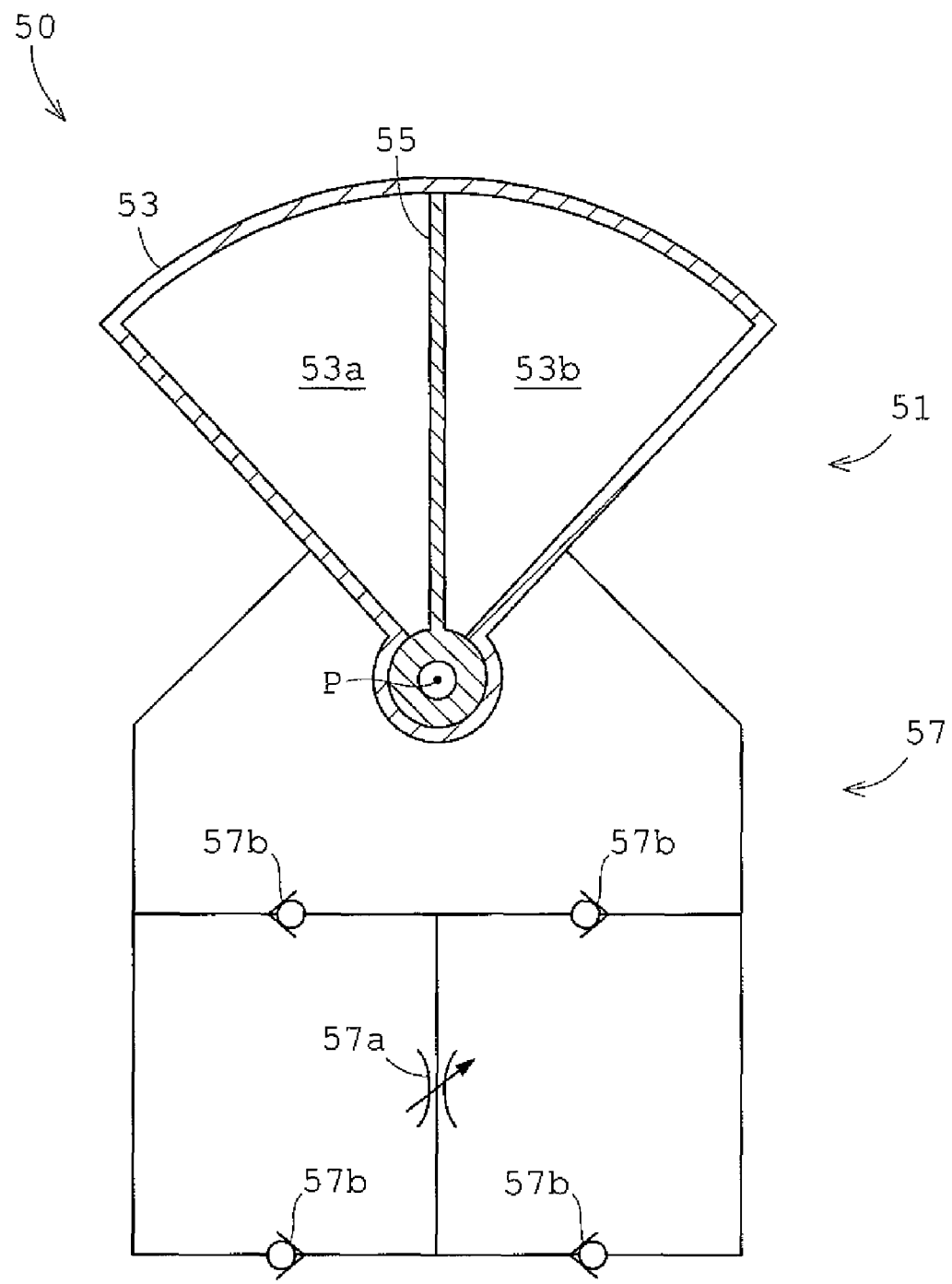
FIG. 8 is a schematic view of a resistance applying mechanism.

Reference is made to FIG. 8. FIG. 8 is a schematic view of a resistance applying mechanism. As shown, a resistance applying mechanism 50 includes a damper body 51 arranged to generate a damping force, and a hydraulic circuit 57 provided for the damper body 51.

The damper body 51 preferably is what is called the rotary type. That is, the damper body 51 has a housing 53 defining a space therein, and a partition member 55 swingable about an axis P relative to the housing 53 and dividing the interior space of the housing 53 into two oil chambers 53a and 53b.

This damper body 51 is provided on the rotary shaft of the balancer mechanism as noted hereinbefore. More particularly, the housing 53 is rigidly attached to the front carrier beam 23, and the partition member 55 is rigidly attached to the front balancer beam 27, to have the axis P in alignment with the rotary shaft of the front balancer beam 27. The housing 53 and partition member 55 correspond to the first member and second member, respectively, according to a preferred embodiment of the present invention.

The hydraulic circuit 57, as shown in FIG. 8, has a variable throttle valve 57a and preferably four check valves 57b arranged between the oil chambers 53a and 53b, for allowing hydraulic oil to flow to and from the oil chamber 53a and oil chamber 53b only through the variable throttle valve 57a. The variable throttle valve 57a serves to vary the flow resistance of the hydraulic oil. The hydraulic oil corresponds to the working fluid according to a preferred embodiment of the present invention.

When the front balancer beam 27 rotates relative to the front carrier beam 23 (vehicle body), the partition member 55 swings relative to the housing 53. Then, one of the oil chambers 53a and 53b diminishes and the other enlarges, while the hydraulic oil flows between the oil chambers 53a and 53b through the variable throttle valve 57a. The flow resistance of this hydraulic oil serves as the damping force for damping relative movement between the housing 53 and partition member 55, which in turn serves as a resistance to rotation of the front balancer beam 27. The strength of this resistance (damping force) is adjusted by the variable throttle valve 57a. The resistance is variable also with the rotating speed of the front balancer beam 27, such that the higher rotating speed of the front balancer beam 27 results in the stronger resistance.

The variable throttle valve 57a corresponds to the adjusting element according to a preferred embodiment of the present invention.

Construction Relating to the Rear Wheels

1. Support Mechanisms—Right Side and Left Side Support Mechanisms

Reference is made to FIGS. 2 and 3. The main frame 11 has, attached to lower rear positions thereof, a right rear swing arm 61R and a left rear swing arm 61L arranged transversely and extending rearward of the vehicle body. The right rear swing arm 61R and left rear swing arm 61L are supported by the main frame 11 to be rotatable about rear pivot shafts 62, respectively. The right rear swing arm 61R has, rotatably supported at a rear end thereof, a drive shaft (not shown) extending transversely of the vehicle body. A right wheel 63R is connected to the drive shaft.

With the right rear swing arm 61R rotating in opposite directions about the rear pivot shaft 62, the right wheel 63R moves up and down relative to the vehicle body. The construction of the support mechanism relating to the left rear swing arm 61L (a drive shaft and a left wheel 63L) is similar to that of the right rear swing arm 61R.

In the following description, the right wheel 63R and left wheel 63L arranged at opposite sides of the vehicle body will be collectively called the "right and left wheels 63" or the "pair of wheels" where appropriate. The right and left wheels 63 (right wheel 63R and left wheel 63L) correspond to the traveling members according to a preferred embodiment of the present invention. The right rear swing arm 61R and left rear swing arm 61L correspond to the right support mechanism and left support mechanism, respectively, according to a preferred embodiment of the present invention.

2. Support Mechanism—Balancer Mechanism

Referring to FIG. 2, between the right rear swing arm 61R and left rear swing arm 61L, a rear carrier beam 65 is integrally supported by the main frame 11 to extend rearward of the vehicle body. The rear carrier beam 65 is further connected through a rear suspension 67 to an upper portion at the rear end of the main frame 11.

The rear carrier beam 65 supports a rear balancer beam 69 to be rotatable about a shaft (hereinafter referred to as the "rotary shaft" where appropriate) extending substantially longitudinally of the vehicle body. The rear balancer beam 69 extends transversely of the vehicle body, and has lower ends of rods 71a and 71b pivotably connected to opposite ends thereof. The upper ends of the rods 71a and 71b are interlocked to substantially middle positions of the right rear swing arm 61R and left rear swing arm 61L, respectively.

When, for example, the right rear swing arm 61R rotates relative to the main frame 11 to lower the right wheel 63R and depress the rod 71a, the rear balancer beam 69 rotates to raise the other rod 71b. As a result, the left rear swing arm 61L is pushed up, and the left wheel 63L moves up by an amount corresponding to the descent of the right wheel 63R. Thus, the right wheel 63R and left wheel 63L move up and down in substantially opposite directions relative to the vehicle body, whereby the right wheel 63R and left wheel 63L contact the traveling surface R1, respectively.

The rear carrier beam 65, rear suspension 67, rear balancer beam 69 and rods 71a and 71b correspond to the balancer mechanism according to a preferred embodiment of the present invention. The above-noted right side support mechanism and left side support mechanism corresponding to the right and left rear wheels 63 and the balancer mechanism correspond to the support mechanism according to a preferred embodiment of the present invention.

3. Drive Mechanism

Reference is made to FIG. 3. A driven sprocket 75R is connected to the drive shaft rotatably supported by the right rear swing arm 61R. A chain 77R is wound around the driven sprocket 75R. The chain 77R is further wound around a drive sprocket 79R. The driving force of the engine 5 (see FIG. 1) is transmitted to the drive sprocket 79R.

The drive sprocket 79R is rotated by the driving force of the engine 5 transmitted thereto, to rotate the driven sprocket 75R through the chain 77R. As a result, the drive shaft and right wheel 63R rotate with the driven sprocket 75R.

The construction of the drive mechanism (the driven sprocket, chain and drive sprocket (with the signs omitted from FIG. 3 for expediency of illustration)) relating to the left rear swing arm 61L is the same as that of the right rear swing arm 61R.

Detectors

Figure 9:
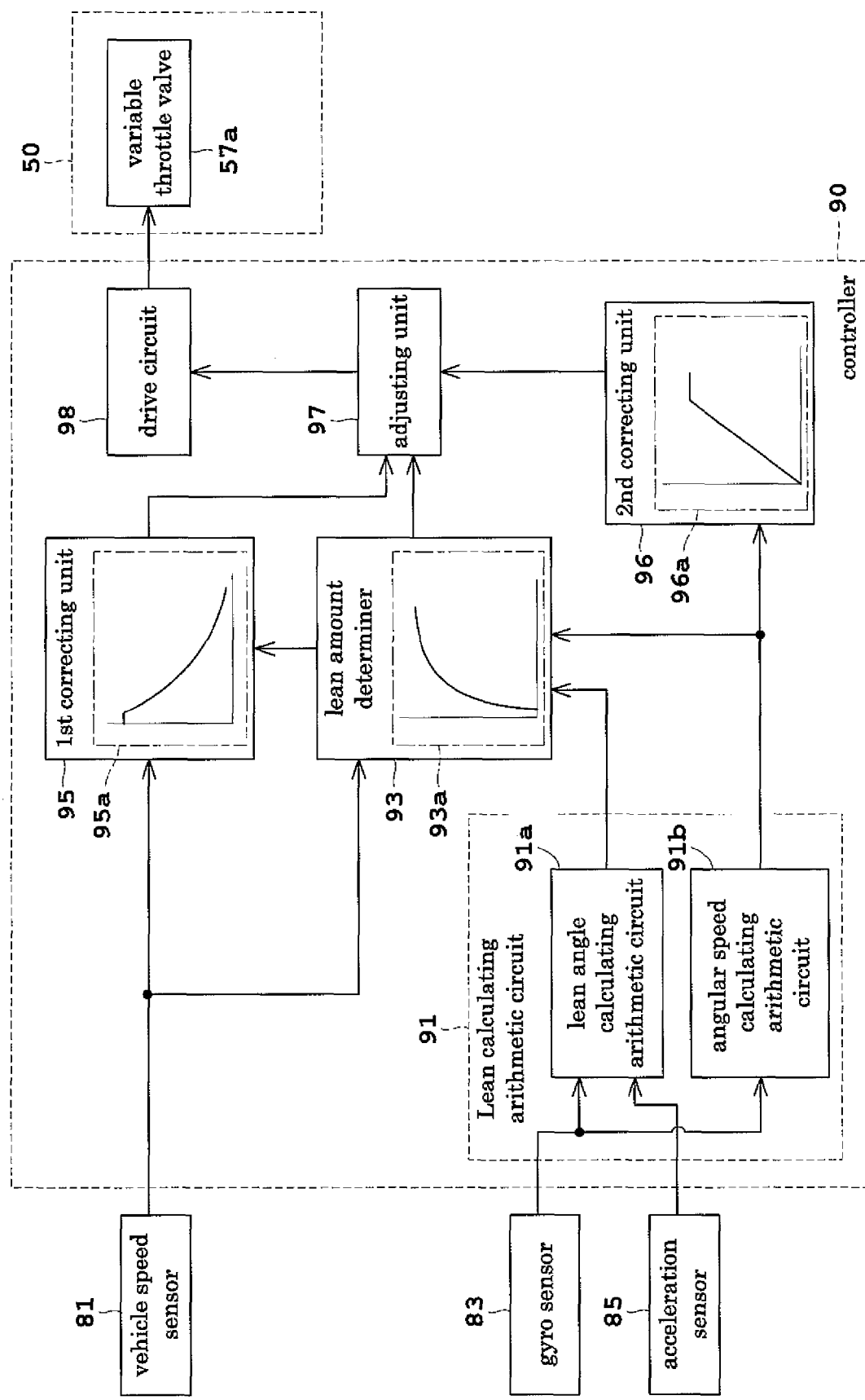
FIG. 9 is a block diagram showing an outline construction of a control system.

The saddle riding type vehicle 1 includes a speed sensor 81, a gyro sensor 83 and an acceleration sensor 85 (see FIGS. 1 and 9).

The speed sensor 81 detects vehicle speed. The speed sensor 81 corresponds to the vehicle speed detecting device according to a preferred embodiment of the present invention.

The gyro sensor 83 detects angular speeds of the vehicle body rolling about an x-axis (an axis extending longitudinally of the vehicle body). A value integrating the angular speeds corresponds to an angle of the vehicle body having rolled about the x-axis.

The acceleration sensor 85 detects a component Gy in a y-direction (transverse direction of the vehicle body) of acceleration due to gravity G as shown in FIG. 10B. FIG. 10B is a view showing a lean angle. In FIG. 10B, sign "g" indicates a direction of acceleration due to gravity G, i.e. the vertical direction, and sign "Gz" indicates a component in a z-direction (up-and-down direction of the vehicle body) of acceleration due to gravity G. The component Gy varies with an angle formed between the vertical direction g and y-direction. A value of component Gy corresponds to the angle of the vehicle body having rolled about the x-axis. As seen from FIG. 10B, the component Gz also varies with an angle formed between the vertical direction g and z-direction. A value of component Gz also corresponds to the angle of the vehicle body having rolled about the x-axis.

Here, the angle formed between the up-and-down direction of the vehicle body (z-direction) and the vertical direction g (which angle is affixed with sign "θ" in FIG. 10B; θ=0 in FIG. 10A and thus sign "θ" is not shown therein) is regarded as the "lean angle of the vehicle body". An absolute value of the "lean angle of the vehicle body" is regarded as the "lean amount of the vehicle body". In other words, the "lean angle of the vehicle body" can be called an angle of the up-and-down direction of the vehicle body (z-direction) inclined right or left relative to the vertical direction g, and can also be called an angle of the vehicle body having rolled about the axis extending longitudinally of the vehicle body (x-direction), provided that a neutral position in which the up-and-down direction of the vehicle body (z-direction) is parallel to the vertical direction g is "0 degree".

Then, each of the angular speed detected by the gyro sensor 83 and the component Gy detected by the acceleration sensor 85 is information on the lean amount of the vehicle body. Each of the gyro sensor 83 and acceleration sensor 85 corresponds to the lean information detecting device according to a preferred embodiment of the present invention.

Controller

FIG. 9 is a block diagram showing an outline construction of a control system provided for the saddle riding type vehicle 1. A controller 90 preferably includes a lean calculating arithmetic circuit 91, a lean amount determiner 93, a first correcting unit 95, a second correcting unit 96, an adjusting unit 97 and a drive circuit 98. The controller 90 preferably includes a central processing unit (CPU) for performing various processes and a storage medium, or a microcomputer. The storage medium stores in advance a determination table 93a for comparison with detection results of each detecting device, a first correction table 95a and a second correction table 96a (described hereinafter).

1. Lean Calculating Arithmetic Circuit 91

The lean calculating arithmetic circuit 91 is functionally divided into a lean angle calculating arithmetic circuit 91a and an angular speed calculating arithmetic circuit 91b. The lean calculating arithmetic circuit 91 receives detection results from the gyro sensor 83 and acceleration sensor 85.

The lean angle calculating arithmetic circuit 91a calculates an angle of rolling about the x-axis of the vehicle body by integrating angular speeds which are detection results of the gyro sensor 83, and calculates a lean angle of the vehicle body by applying an appropriate offset value thereto. Similarly, the lean angle calculating arithmetic circuit 91a calculates a lean angle of the vehicle body based on the component Gy which is a detection result of the acceleration sensor 85. The lean angle calculating arithmetic circuit 91a carries out a correction process based on the two lean angles of the vehicle body obtained, to obtain a lean angle of the vehicle body with increased accuracy.

Reference is made to FIGS. 10A and 10B. As seen from FIGS. 10A and 10B, even though the positional relationships between the vehicle body and the right and left wheels 19 (particularly the distance between the vehicle body and right wheel 19R and the distance between the vehicle body and left wheel 19L) are the same, positions of the vehicle body are different when conditions of the traveling surface R1 are different, such that the vehicle body is in the neutral position in FIG. 10A, while the vehicle body is leaning leftward in FIG. 10B. Even in such a case, with the lean angle obtained by the lean angle calculating arithmetic circuit 91a, a lean of the vehicle body can be determined accurately regardless of conditions and the like of the traveling surface R1.

In this preferred embodiment, the lean angle obtained by the lean angle calculating arithmetic circuit 91a can take positive and negative values. If, for example, the lean angle is positive when the vehicle body leans to the right side, then the lean angle has a negative value when the vehicle body leans to the left side.

The angular speed calculating arithmetic circuit 91b obtains an angular speed of the lean angle from the detection results of the gyro sensor 83. The process of the angular speed calculating arithmetic circuit 91b is not limited to this. For example, the angular speed calculating arithmetic circuit 91b may be constructed to calculate an angular speed of the lean angle through a differentiation process of the lean angle obtained by the lean angle calculating arithmetic circuit 91a.

2. Lean Amount Determiner 93

The lean amount determiner 93 determines whether the lean amount of the vehicle body which is a degree (absolute value) of the lean angle is "decreasing" or "increasing". The lean amount determiner 93 determines also whether the lean amount of the vehicle body is larger than a first angle or not. Further, the lean amount determiner 93 determines whether the resistance generated by the resistance applying mechanism 50 according to these results of determination should be a first resistance, a second resistance or a third resistance. Each process of the lean amount determiner 93 will particularly be described hereinafter.

The lean amount determiner 93 receives the lean angle and the angular speed of the lean angle calculated by the lean calculating arithmetic circuit 91 and a vehicle speed which is a detection result of the vehicle speed sensor 81.

The lean amount determiner 93 determines whether the lean amount of the vehicle body is "decreasing" or "increasing". The "decrease" in the lean amount of the vehicle body is a variation in the lean amount where the up-and-down direction of the vehicle body approaches the neutral position parallel to a substantially vertical direction (that is, the vehicle body returns to the neutral position). The "increase" in the lean amount of the vehicle body is a variation in the lean amount where the vehicle body moves far (away) from the neutral position. Specifically, this determination is made through the following process.

The lean amount determiner 93 determines whether the value of the inputted lean angle is positive or negative, and whether the value of the angular speed of the lean angle is positive or negative. In the case of the lean angle determined to have a positive value as a result, the lean amount determiner 93 determines that the lean amount is decreasing when the angular speed of the lean angle is negative, and that the lean amount is not decreasing when the angular speed of the lean angle is not negative. In the case of the lean angle having a negative value, the lean amount determiner 93 determines that the lean amount is decreasing when the angular speed of the lean angle is positive, and that the lean amount is not decreasing when the angular speed of the lean angle is not positive.

However, the process for making this determination is not limited to the above example. This determination may be made through the following process, for example. First, a lean amount of the vehicle body is derived from a lean angle inputted thereto, and a variation in the lean amount of the vehicle body is calculated through a differentiation process of the derived lean amount of the vehicle body. Then, the lean amount determiner 93 determines that the lean amount is decreasing when the variation in the lean amount of the vehicle body is negative. The lean amount determiner 93 determines that the lean amount is increasing when the variation in the lean amount of the vehicle body is not negative.

The lean amount determiner 93 also determines whether the lean amount of the vehicle body is larger than the first angle. Specifically, this determination is made through the following process. The lean amount determiner 93 derives a lean amount of the vehicle body from a lean angle inputted. As noted hereinbefore, the lean amount of the vehicle body is an absolute value of the lean angle of the vehicle body. The lean amount determiner 93 sets the first angle based on the determination table 93a and a vehicle speed inputted. This determination table 93a has the first angle set as correlated with vehicle speed. The lean amount determiner 93 sets the first angle correlated with vehicle speed in the determination table 93a. The determination table 93a in this preferred embodiment has the first angle specified as related to vehicle speed beforehand so that the first angle increases with vehicle speed. The first angle always has positive values. The lean amount determiner 93 compares the lean amount of the vehicle body derived with the first angle set, and determines whether the lean amount of the vehicle body is larger than the first angle. When the lean amount of the vehicle body is not determined to be larger than the first angle, the lean amount of the vehicle body is regarded as corresponding to the first angle or less.

Figure 11:
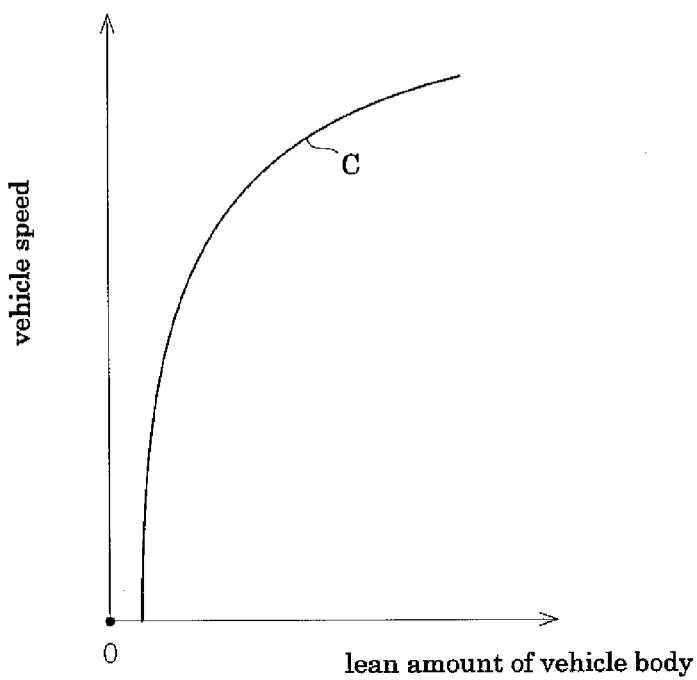
FIG. 11 is a view schematically showing an example of determination table specifying a first angle.

The determination table 93a specifying the first angle will be described with reference to FIG. 11. FIG. 11 is a view schematically showing an example of determination table 93a specifying the first angle. In FIG. 11, the horizontal axis represents the lean amount of the vehicle body while the vertical axis represents vehicle speed. Curve C indicates the first angle. As shown, the lower the vehicle speed is, the smaller is the first angle, and the first angle is set to increase with the vehicle speed.

Such vehicle speed dependence of the first angle will be described. Gravity and centrifugal force act on the saddle riding type vehicle 1 making a turn while leaning the vehicle body. Gravity acts in a direction to increase the lean of the vehicle body of the saddle riding type vehicle 1, while centrifugal force acts in a direction to decrease the lean of the vehicle body. The vehicle body of the saddle riding type vehicle 1 making a turn leans in the direction of a resultant of gravity and centrifugal force. Centrifugal force is variable with the vehicle speed of the saddle riding type vehicle 1, such that centrifugal force becomes stronger as vehicle speed becomes faster. When, for example, vehicle speed becomes slow, the above direction of the resultant will approach the vertical direction, and the lean amount of the vehicle body will become small. If the lean amount of the vehicle body becomes larger than the direction of the resultant, the lean amount of the vehicle body will become still larger due to gravity. Then, the rider has to carry out a return control. The return control requires the rider, for example, to operate the accelerator grip 42 and increase vehicle speed, to turn the handlebar 41 and make the turning radius small, or to change the rider's position and shift the position of the center of gravity.

As will be understood from the relationship between vehicle speed and direction of the resultant, the slower vehicle speed makes the smaller lean amount of the vehicle body enabling a comfortable run. The determination table 93a illustrated in FIG. 11 specifies the first angle by taking such speed dependence into consideration.

The lean amount determiner 93 determines also a class of resistance to be generated by the resistance applying mechanism 50. Specifically, the lean amount determiner 93 carries out the following process to select one of the first resistance, second resistance and third resistance. The lean amount determiner 93 determines that the resistance generated by the resistance applying mechanism 50 should be the first resistance when the lean amount of the vehicle body is determined to be increasing and the lean amount of the vehicle body is determined to be larger than the first angle. The lean amount determiner 93 determines that the resistance generated by the resistance applying mechanism 50 should be the third resistance when the lean amount of the vehicle body is determined to be increasing and the lean amount of the vehicle body is determined to correspond to the first angle or less. Further, the resistance generated by the resistance applying mechanism 50 is determined to be the second resistance when the lean amount of the vehicle body is determined to be decreasing.

3. First Correcting Unit 95

The first correcting unit 95 acquires a first factor for correcting the strength of resistance according to vehicle speed. More particularly, the first correcting unit 95 receives vehicle speeds which are detection results of the speed sensor 81. The first correcting unit 95 has a first correction table 95a correlating the first factor and vehicle speed, and obtains the first factor based on this first correction table 95a and the vehicle speed inputted. The first factor is specified beforehand in the first correction table 95a as related to vehicle speed, to include a region where the first factor becomes smaller as the vehicle speed increases.

Figure 12:
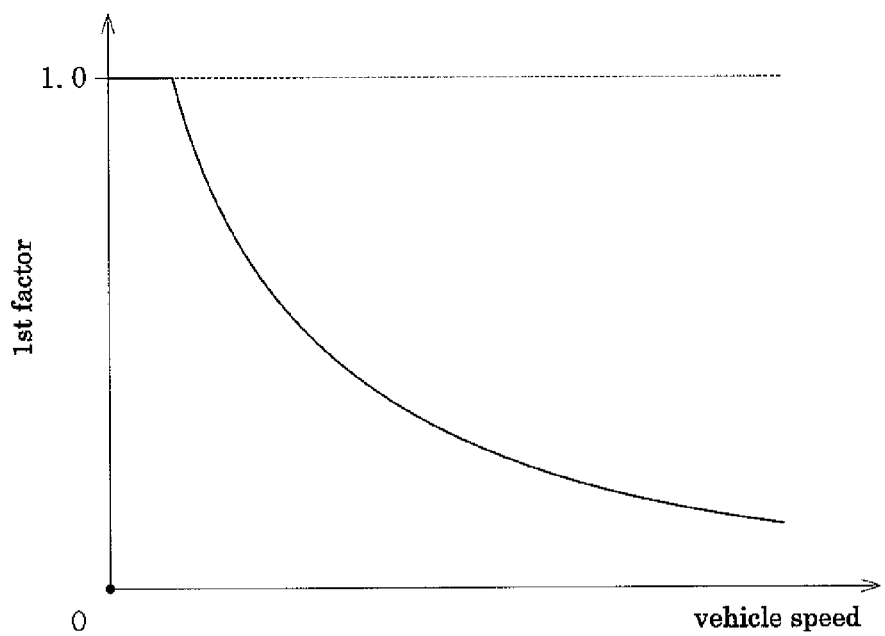
FIG. 12 is a view schematically showing an example of first correction table specifying a first factor.

FIG. 12 is a view schematically showing an example of first correction table 95a. In FIG. 12, the horizontal axis represents vehicle speed, while the vertical axis represents the first factor. As shown, this first correction table 95a specifies a fixed value (e.g., maximum "1.0") for the first factor in a partial range where vehicle speed is very low. In the other vehicle speed range, the first factor is specified to become small as the vehicle speed becomes fast.

4. Second Correcting Unit 96

The second correcting unit 96 acquires a second factor for correcting the strength of resistance according to angular speeds of the lean amount. More particularly, the second correcting unit 96 receives an angular speed of the lean angle inputted from the angular speed calculating arithmetic circuit 91b. The second correcting unit 96 calculates an absolute value of the angular speed of the lean angle. The absolute value of the angular speed of the lean angle is hereinafter called the "angular speed of the lean amount". The second correcting unit 96 has a second correction table 96a correlating the second factor and angular speed of the lean amount, and obtains the second factor corresponding to the angular speed of the lean amount based on this second correction table 96a and the angular speed of the lean amount.

Figure 13:
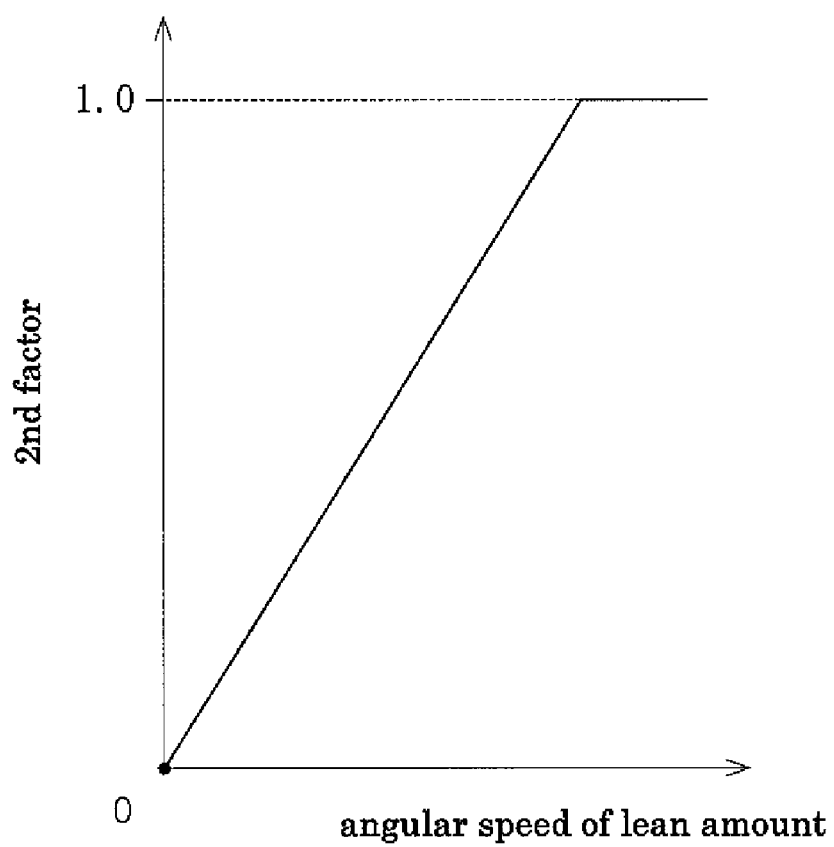
FIG. 13 is a view schematically showing an example of second correction table specifying a second factor.

FIG. 13 is a view schematically showing an example of second correction table 96a. In FIG. 13, the horizontal axis represents the angular speed of the lean amount, while the vertical axis represents the second factor. When the angular speed of the lean amount is "0", the second factor has minimum value "0". The second factor increases proportionally from "0" to "1" as the angular speed of the lean amount increases from "0". In a range beyond a certain value of the angular speed of the lean amount, the second factor has a fixed value (maximum "1.0"). Thus, the second correction table 96a illustrated in FIG. 13 includes a region where the second factor increases with the angular speed of the lean amount. In this region, the second factor increases in proportion to the angular speed of the lean amount.

5. Adjusting Unit 97

The adjusting unit 97 adjusts the first resistance, second resistance and third resistance, and determines the strength of resistance to be generated finally by the resistance applying mechanism 50. In this preferred embodiment, the resistance is the damping force of the resistance applying mechanism 50, and the adjusting unit 97 determines the strength of this damping force. Each process of the adjusting unit 97 will particularly be described hereinafter.

The adjusting unit 97 receives the resistance determined by the lean amount determiner 93, the first factor inputted from the first correcting unit 95, and the second factor inputted from the second correcting unit 96. The adjusting unit 97 has information on default values of the first resistance, second resistance and third resistance. For example, the default value of the first resistance is a substantially maximum value of the damping force of the resistance applying mechanism 50, and each default value of the second resistance and third resistance is a substantially minimum value of the damping force of the resistance applying mechanism 50.

When the resistance is the first resistance, the adjusting unit 97 multiplies the default value of the first resistance by the first factor and second factor to correct the first resistance, and adjusts the resistance to be generated by the resistance applying mechanism 50 to the first resistance. The first resistance set has been corrected by the first factor, and therefore tends to become small with an increase in vehicle speed. Further, the first resistance set has been corrected by the second factor, and therefore tends to become large with an increase in the angular speed of the lean amount of the vehicle body.

When the resistance is the third resistance, the adjusting unit 97 does not correct the default value of the third resistance, but sets the third resistance to be generated by the resistance applying mechanism 50 to the default value of the third resistance.

Thus, the relatively weak, third resistance is set when the lean amount is increasing and is at the first angle or less. The relatively strong, first resistance is set when the lean amount exceeds the first angle and is increasing.

When the resistance is the second resistance, the adjusting unit 97 does not correct the default value of the second resistance, but sets the second resistance to be generated by the resistance applying mechanism 50 to the default value of the second resistance.

The adjusting unit 97 supplies the first resistance, second resistance or third resistance set as described above to the drive circuit 98.

6. Drive Circuit 98

The drive circuit 98 drives the variable throttle valve 57a based on results of the processes by the adjusting unit 97. As a result, the damping force of the resistance applying mechanism 50 is changed to the damping force set by the adjusting unit 97.

The support mechanisms relating to the front wheels and rear wheels, resistance applying mechanism 50, speed sensor 81, gyro sensor 83, acceleration sensor 85 and controller 90 described above correspond to the body leaning control system according to a preferred embodiment of the present invention.

Figure 14:
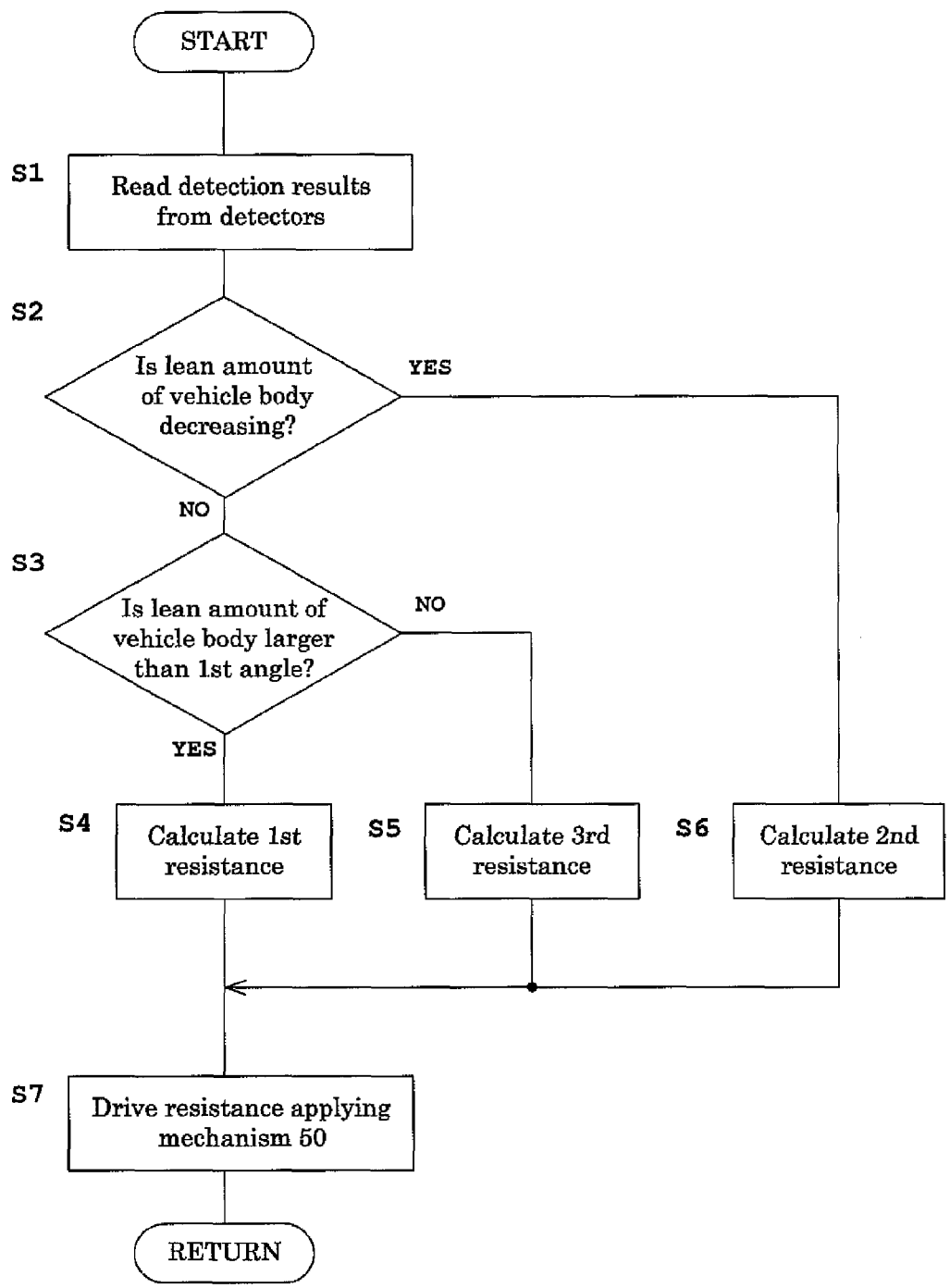
FIG. 14 is a flow chart showing an operating sequence of a body leaning control system.

Next, an example of operation of the saddle riding type vehicle 1 will be described centering on the body leaning control system according to the present preferred embodiment. FIG. 14 is a flow chart showing an operating sequence of the body leaning control system.

Step S1

Read Detection Results from Detectors

The controller 90 reads detection results from the vehicle speed sensor 81, gyro sensor 83 and acceleration sensor 85 at fixed intervals of time. The vehicle speed which is the detection result of the vehicle speed sensor 81 is inputted to the lean amount determiner 93 and first correcting unit 95. The angular speed which is the detection result of the gyro sensor 83 and the component Gy which is the detection result of the acceleration sensor 85 are inputted to the lean calculating arithmetic circuit 91.

Step S2

Is Lean Amount of Vehicle Body on Decrease?

The lean calculating arithmetic circuit 91 acquires a lean angle and an angular speed of the lean angle from the angular speed and component Gy inputted, and supplies the acquired lean angle and angular speed of the lean angle to the lean amount determiner 93. The lean amount determiner 93 determines, based on the inputted lean angle and angular speed of the lean angle, whether the lean amount of the vehicle body is decreasing. When, as a result, the lean amount of the vehicle body is determined to be increasing, the operation proceeds to step S3. When the lean amount of the vehicle body is determined to be decreasing, the lean amount determiner 93 selects the second resistance to be generated by the resistance applying mechanism 50, and the operation proceeds to step S6.

Step S3

Is Lean Amount of Vehicle Body Larger than First Angle?

The lean amount determiner 93 determines, based on the lean angle, vehicle speed and determination table 93a, whether the lean amount of the vehicle body is larger than the first angle corresponding to the vehicle speed. When, as a result, the lean amount of the vehicle body is determined to be larger than the first angle, the lean amount determiner 93 selects the first resistance to be generated by the resistance applying mechanism 50, and the operation proceeds to step S4. When the lean amount of the vehicle body is determined to be smaller than the first angle, the lean amount determiner 93 selects the third resistance to be generated by the resistance applying mechanism 50, and the operation proceeds to step S5.

Step S4
Calculate First Resistance

The lean amount determiner 93 supplies the adjusting unit 97 information that the resistance is the first resistance. The first correcting unit 95 acquires the first factor based on the vehicle speed and first correction table 95*a*, and supplies this first factor to the adjusting unit 97. The lean calculating arithmetic circuit 91 supplies the angular speed of the lean angle to the second correcting unit 96. The second correcting unit 96 acquires the second factor based on the angular speed of the lean angle and second correction table 96*b*, and supplies this second factor to the adjusting unit 97.

The adjusting unit 97 corrects the default value corresponding to the first resistance with the first factor and second factor, thereby adjusting the strength of the first resistance. The adjusting unit 97 gives the adjusted first resistance to the drive circuit 98.

Step S5
Calculate Third Resistance

The lean amount determiner 93 gives the adjusting unit 97 information that the resistance is the third resistance. The adjusting unit 97 sets the strength of the third resistance to the default value corresponding to the third resistance, and gives the set third resistance to the drive circuit 98. The strength of the third resistance is a substantially minimum value of the resistance of the resistance applying mechanism 50 as noted hereinbefore. In this step S5, the first correcting unit 95 may or may not give the first factor to the adjusting unit 97. Similarly, the second correcting unit 96 may or may not give the second factor to the adjusting unit 97.

Step S6
Calculate Second Resistance

The lean amount determiner 93 supplies the adjusting unit 97 with information indicating that the resistance is the second resistance. The adjusting unit 97 sets the strength of the second resistance to the default value corresponding to the second resistance, and supplies the set second resistance to the drive circuit 98. The strength of the second resistance is the substantially minimum value of the resistance of the resistance applying mechanism 50. In this step S6, the first correcting unit 95 may or may not give the first factor to the adjusting unit 97. Similarly, the second correcting unit 96 may or may not give the second factor to the adjusting unit 97.

Step S7
Drive Resistance Applying Mechanism 50

The drive circuit 98 drives the variable throttle valve 57*a* to control the damping force of the resistance applying mechanism 50 to the adjusted first resistance, second resistance or third resistance. In the case of the second resistance and third resistance, the opening of variable throttle valve 57*a* becomes a maximum.

The resistance applying mechanism 50 resists, with the controlled damping force, rotation of the front balancer beam 27 relative to the front carrier beam 23. Since rotation of the front balancer beam 27 is interlocked with up-and-down motions of the right and left wheels 19, the damping force of the resistance applying mechanism 50 acts to resist the up-and-down motions of the right and left wheels 19 relative to the vehicle body.

In a situation where the controller 90 sets the damping force of the resistance applying mechanism 50 to the first resistance, the lean amount of the vehicle body exceeds a range for permitting the rider to return the vehicle body to the neutral position easily and the lean amount of the vehicle body is increasing. On the other hand, the first resistance is relatively strong. Thus, the resistance applying mechanism 50 inhibits rotation of the front balancer beam 27 relative to the front carrier beam 23, inhibits the up-and-down motions of the right and left wheels 19 relative to the vehicle body, and inhibits an increase in the lean amount of the vehicle body. As a result, the up-and-down motions of the right and left rear wheels 63 also are inhibited.

Consequently, a slight return control can return the lean amount of the vehicle body to the first angle or less. The lean amount of the vehicle body can be returned to the first angle or less by an accelerator operation for slightly increasing vehicle speed, or by a slight shifting of the center of gravity, for example. The rider can therefore continue a comfortable run.

In a situation where the controller 90 sets the damping force of the resistance applying mechanism 50 to the third resistance, the lean amount of the vehicle body is within the range for permitting the rider to return the vehicle body to the neutral position easily and the lean amount of the vehicle body is increasing. On the other hand, the third resistance corresponds to the substantially minimum value of the damping force of the resistance applying mechanism 50, and is very weak. Thus, the resistance applying mechanism 50 can hardly prevent rotation of the front balancer beam 27, and the lean amount of the vehicle body increases relatively easily. The rider can therefore travel while leaning the vehicle body freely.

In a situation where the controller 90 sets the damping force of the resistance applying mechanism 50 to the second resistance, the lean amount of the vehicle body is decreasing. On the other hand, the second resistance corresponds to the substantially minimum value, and is very weak. Thus, the resistance applying mechanism 50 hardly inhibits rotation of the front balancer beam 27 with the second resistance, and hardly inhibits variations in the lean amount of the vehicle body. Therefore, the lean amount of the vehicle body decreases relatively easily, and the rider can very easily decrease the lean amount of the vehicle body. In this way, the rider can easily return the vehicle body to the neutral position, and can travel comfortably.

Thus, with the body leaning control system and the saddle riding type vehicle 1 having this system according to this preferred embodiment, the controller 90 preferably sets the second resistance to be weaker than the first resistance when the lean amount of the vehicle body is decreasing. As a result, the vehicle body is not positively prevented from returning to the neutral position, and the rider can easily return the vehicle body to the neutral position. The rider can therefore travel comfortably.

Since the controller 90 controls the strength of the second resistance to the substantially minimum value of the resistance of the resistance applying mechanism 50, the rider can return the vehicle body to the neutral position very easily.

The lean angle of the vehicle body, the lean amount of the vehicle body, the angular speed of the lean angle and the angular speed of the lean amount which the lean calculating arithmetic circuit 91 and lean amount determiner 93 acquired based on the detection results from the gyro sensor 83 and acceleration sensor 85 all have, as a point of reference, the neutral position where the up-down-direction of the vehicle body (z-direction) is parallel to the vertical direction g. Thus, positions of the vehicle body relative to a substantially vertical direction can be determined accurately regardless of traveling surface conditions, for example. It is also possible to determine accurately regardless of traveling surface conditions whether a variation in the position of the vehicle body is one returning to the neutral position, or one moving away from the neutral position (in a direction to topple the vehicle body).

Both the lean amount of the vehicle body and the angular speed of the lean angle can be obtained based on the detection results from the gyro sensor 83 and acceleration sensor 85. Therefore, the apparatus construction can be simplified compared with a construction in which a detecting device for detecting the lean amount of the vehicle body and a detecting device for detecting the angular speed of the lean amount are provided separately.

The controller 90 preferably sets the third resistance weaker than the first resistance when the lean amount of the vehicle body is increasing within a range up to the first angle. Consequently, the lean amount of the vehicle body can increase relatively easily when the lean amount of the vehicle body is at the first angle or less, and the rider can freely lean the vehicle body. Particularly in this preferred embodiment, since the third resistance corresponds to the substantially minimum value of the damping force of the resistance applying mechanism 50, the rider can increase the lean amount of the vehicle body very easily.

The lean amount of the vehicle body is inhibited from increasing in a range where the lean amount of the vehicle body exceeds the first angle, which can reduce the burden of the rider for returning the vehicle body to the neutral position. When the lean amount reduces from a state of exceeding the first angle to a state of being at the first angle or less, switching is made from the first resistance to the third resistance. Strictly speaking, this reduces the burden of the rider for making the lean amount of the vehicle body at least the first angle or less. The rider can therefore travel comfortably.

The first angle is set as correlated with vehicle speed to increase with vehicle speed. In an actual traveling situation, therefore, variations in the position of the vehicle body are not inhibited more than necessary, thereby not preventing a comfortable run.

The controller 90 (adjusting unit 97) adjusts the first resistance so that the first resistance may become weaker as vehicle speed becomes higher. Therefore, when the lean amount of the vehicle body exceeds the first angle, the first resistance of proper strength can be applied according to a speed level.

The controller 90 (adjusting unit 97) adjusts the first resistance so that the first resistance may become stronger as the angular speed of the lean amount becomes higher. Therefore, the first resistance of proper strength can be applied according to an extent of lean variation of the vehicle body, thereby effectively inhibiting the vehicle body from leaning to excess.

In this preferred embodiment, the controller 90 preferably includes the first correcting unit 95 which acquires the first factor, the second correcting unit 96 which acquires the second factor, and the adjusting unit 97 which corrects and calculates the first resistance with the first factor and second factor. Consequently, the first resistance can be adjusted to increase with the angular speed of the lean amount when the vehicle speed is constant, and to decrease with an increase in vehicle speed when the angular speed of the lean amount is constant.

The controller 90 automatically controls the resistance applying mechanism 50 without requiring a special operation to be performed by the rider. This can cope with unexpected wobbling and the like of the vehicle.

The resistance applying mechanism 50, by applying resistance directly to the front balancer beam 27, can inhibit up-and-down motions not only of the right and left wheels 19 but of the right and left wheels 63. That is, the resistance applying mechanism 50, while having a simplified structure, can effectively inhibit up-and-down motions of the right and left wheels 19 and 63, and can effectively inhibit variations in the lean angle of the vehicle body.

The present invention is not limited to the foregoing preferred embodiment, but may be modified as described in the following paragraphs.

In the foregoing preferred embodiment, the controller 90, particularly the first correcting unit 95 and adjusting unit 97, preferably adjusts the first resistance to become weaker as vehicle speed becomes faster. The first resistance may be adjusted to become weaker as vehicle speed becomes faster over the whole range of vehicle speed or in a partial range of vehicle speed. For example, in one vehicle speed range, the first resistance may be adjusted to decrease as vehicle speed increases, and in the other vehicle speed range, the first resistance may be adjusted to a fixed value. In a different modification, the first resistance may be adjusted to a fixed value over the whole range of vehicle speed.

In the first correction table 95a described in the foregoing preferred embodiment, the first factor and vehicle speed preferably are correlated by means of the curve indicating that the first factor diminishes by the greater amount for the lower vehicle speed range, but this is not limitative. The first factor may be modified to diminish at a fixed rate with an increase in vehicle speed. In other words, in the first correction table 95a, the first factor may diminish linearly with an increase in vehicle speed.

In the foregoing preferred embodiment, the controller 90, particularly the second correcting unit 96 and adjusting unit 97, preferably adjusts the first resistance to become stronger as the angular speed of the lean amount becomes faster. The first resistance may be adjusted to become stronger as the angular speed of the lean amount becomes faster over the whole range of angular speed of the lean amount or in a partial range of angular speed of the lean amount. For example, in one range of angular speed of the lean amount, the first resistance may be adjusted to increase with the angular speed of the lean amount, and in the other range of angular speed of the lean amount, the first resistance may be adjusted to a fixed value. In a different modification, the first resistance may be adjusted to a fixed value over the whole range of angular speed of the lean amount.

In the second correction table 96a described in the foregoing preferred embodiment, the second factor and the angular speed of the lean amount preferably are correlated such that the second factor increases at a fixed rate with an increase in the angular speed of the lean amount. In other words, in the second correction table 96a, the second factor enlarges linearly with an increase in the angular speed of the lean amount. This is not limitative. In the second correction table 96a, the second factor and the angular speed of the lean amount may be correlated by means of a curve.

In the foregoing preferred embodiment, the adjusting unit 97 preferably sets a substantially minimum value of the damping force of the resistance applying mechanism 50 as the third resistance, but this is not limitative. The adjusting unit 97 may be modified to set a larger value than the substantially minimum value as the third resistances as long as it is weaker than the first resistance. For example, the default value of the third resistance may be selected as appropriate, or the default value of the third resistance may be corrected.

When correcting the third resistance, the first factor and second factor may be used, or factors other than these may be used.

In the foregoing preferred embodiment, the controller 90 preferably sets the first resistance or third resistance when the lean amount of the vehicle body is increasing, but this is not limitative. For example, the controller 90 may be modified to set the first resistance uniformly, regardless of whether the lean amount of the vehicle body exceeds the first angle or not, when the lean amount of the vehicle body is increasing. This modified preferred embodiment can dispense with the process carried out by the lean amount determiner 93 to determine whether the lean amount of the vehicle body is larger than the first angle.

This modified preferred embodiment may further include a third correcting unit which acquires a third factor for correcting the first resistance according to the lean amount of the vehicle body, and outputs the acquired third factor to the adjusting unit 97, wherein the adjusting unit 97 is arranged to adjust the first resistance with the first factor, second factor and third factor. This construction can adjust the strength of the first resistance appropriately according to the lean amount of the vehicle body.

In the foregoing preferred embodiment, the controller 90 preferably divides the resistance when the lean amount of the vehicle body is increasing, into the two types (first resistance and third resistance), and sets the first resistance or third resistance depending on whether the lean amount of the vehicle body is larger than the first angle. This is not limitative. For example, the vehicle state when the lean amount is increasing may be divided into three or more, and the resistance into three or more types corresponding thereto. The vehicle state may preferably be the lean amount of the vehicle body as described in the foregoing preferred embodiment, but it is not limitative. The vehicle state may include, besides the angular speed of the lean amount and vehicle speed, an amount of operation of the brakes, acceleration of vehicle speed, and opening of the throttle, for example. And the controller 90 may be modified to control the resistance applying mechanism 50 by setting one of the above three or more resistances when the lean amount of the vehicle body is increasing.

In the foregoing preferred embodiment, the lean amount determiner 93 preferably sets the first angle to increase with vehicle speed over the whole range of vehicle speed, but this is not limitative. A modification may be made to set the first angle to include a region where the first angle increases with vehicle speed. For example, in one vehicle speed range, the first angle may be set to increase with vehicle speed, and in the other vehicle speed range, the first angle may be set to a fixed value. In a different modification, the first angle may be set to a fixed value over the whole range of vehicle speed.

In the determination table 93a described in the foregoing preferred embodiment, the first angle and vehicle speed are preferably correlated by means of the curve C indicating that the first angle enlarges by the greater amount for the higher vehicle speed range, but this is not limitative. The first angle may be modified to increase in proportion to vehicle speed.

In the foregoing preferred embodiment, the first resistance, second resistance and third resistance determined by the lean amount determiner 93 preferably constitute a classification of resistances, but this is not limitative. For example, the lean amount determiner 93 may be modified to select a default value of each of the first resistance, second resistance and third resistance, and give the default value to the adjusting unit 97.

In the foregoing preferred embodiment, the adjusting unit 97 preferably sets a substantially minimum value of the damping force of the resistance applying mechanism 50 as the second resistance, but this is not limitative. The adjusting unit 97 may be modified to set a larger value than the substantially minimum value as the second resistance as long as it is weaker than the first resistance. For example, a default value of the second resistance may be selected as appropriate, or the default value of the second resistance may be corrected. When correcting the second resistance, the first factor and second factor may be used, or factors other than these may be used.

In the foregoing preferred embodiment, the variable throttle valve 57a is preferably used to vary the flow resistance of hydraulic oil, but this is not limitative. The variable throttle valve 57a may be replaced with any other mechanism designed or selected as appropriate for varying the flow resistance of hydraulic oil.

In the foregoing preferred embodiment, the damper body 51 preferably has hydraulic oil, but this is not limitative. Instead, for example, the damper body may be modified, as appropriate, to have a magnetic fluid as working fluid.

Figure 15:
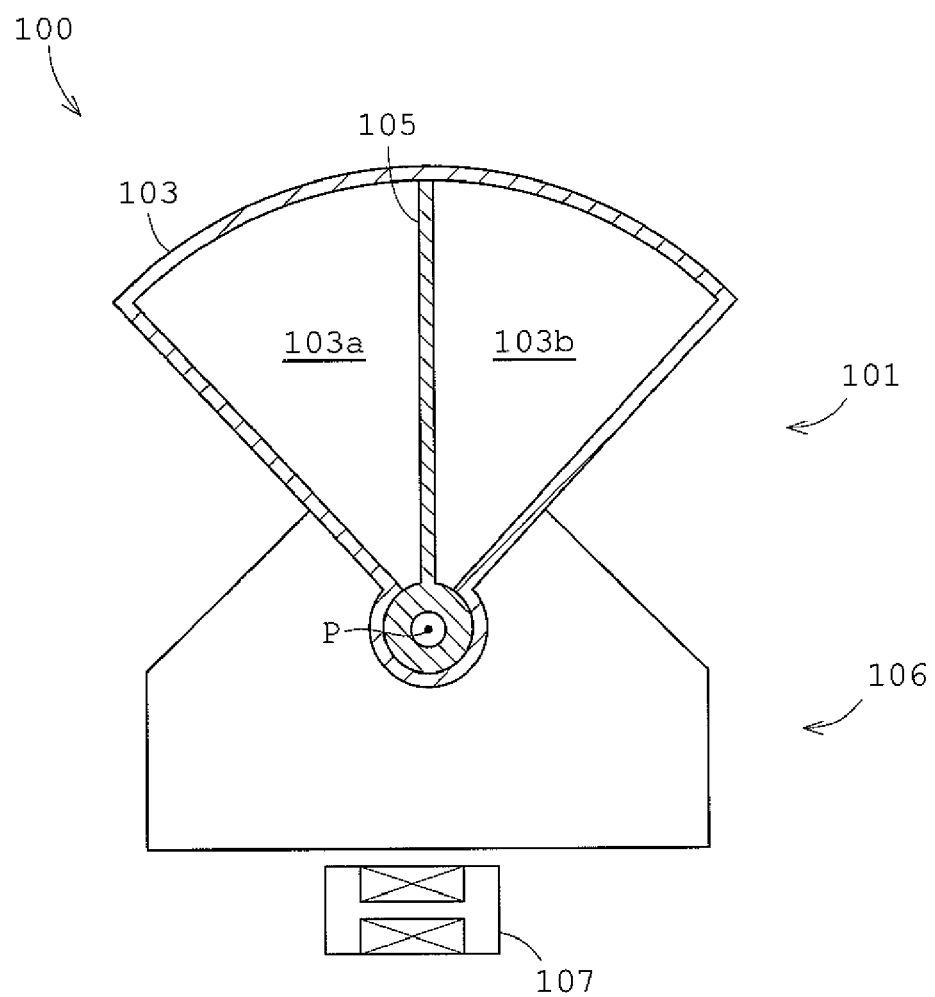
FIG. 15 is a schematic view of a resistance applying mechanism according to a modified preferred embodiment of the present invention.

FIG. 15 is a schematic view of a resistance applying mechanism according to a modified preferred embodiment of the present invention. A resistance applying mechanism 100 includes a damper body 101 having a magnetic fluid as working fluid. The damper body 101 has a housing 103 defining a space therein, and a partition member 105 swingable about an axis P relative to the housing 103 and dividing the interior space of the housing 103 into two oil chambers 103a and 103b. The two chambers 103a and 103b preferably contain the magnetic fluid, respectively. A pipe 106 extends between the chamber 103a and chamber 103b for allowing the magnetic fluid to flow therebetween. A magnetic field generating coil 107 is disposed adjacent the pipe 106. The controller 90 supplies a current of arbitrary current value to the magnetic field generating coil 107. The controller 90 is omitted from FIG. 15.

When the current is supplied from the controller 90, the magnetic field generating coil 107 will generate a magnetic field corresponding to the current value supplied. The magnetic fluid has viscosity that is variable with a magnetic field strength to change flow resistance. This flow resistance serves as the damping force for damping relative movement between the housing 103 and partition member 105. The controller 90 controls the damping force of the damper body 101 by varying the current value. The magnetic field generating coil 107 corresponds to the adjusting element according to a preferred embodiment of the present invention.

In the foregoing preferred embodiment, the damper body 51 is preferably provided on the rotary shaft of the balancer mechanism, but this is not limitative. For example, the damper body 51 may be provided on the lower pivot shaft 14 or upper pivot shaft 16, and may be modified to apply resistance to rotation of the lower swing arm 13 or upper swing arm 15. The rotations of the lower swing arm 13 and upper swing arm 15 are interlocked to up-and-down motions of the right and left wheels 19. In such a modified preferred embodiment also, the resistance applying mechanism 50 can apply the resistance to the up-and-down motions of the right and left wheels 19 through the support mechanism.

In the foregoing preferred embodiment, the damper body 51 preferably is the rotary type, but this is not limitative. A modification may be made to use a cylinder type damper body for forming the resistance applying mechanism.

Figure 16:
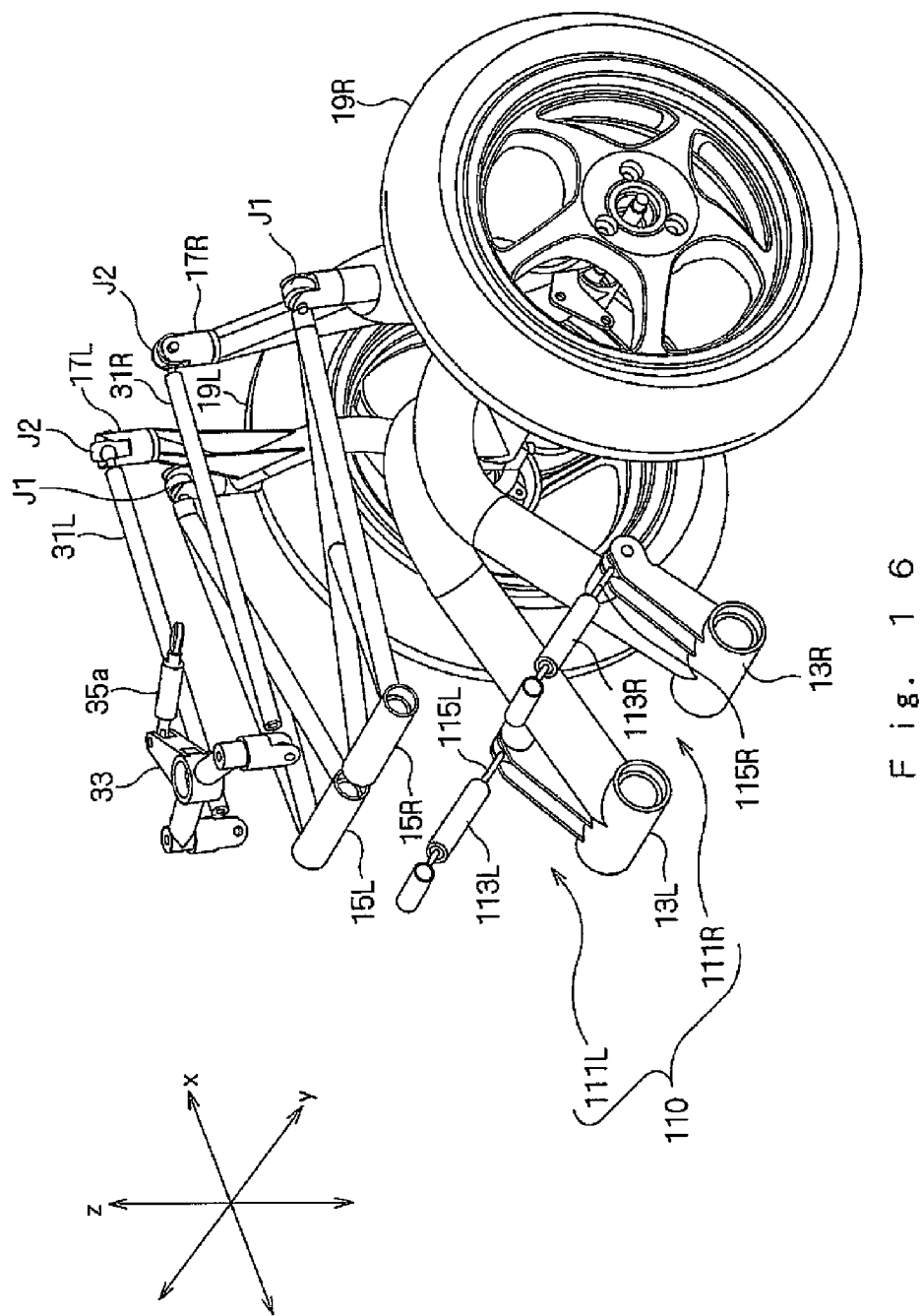
FIG. 16 is a perspective view of a principal portion of a resistance applying mechanism according to a further modified preferred embodiment of the present invention.
Figure 17:
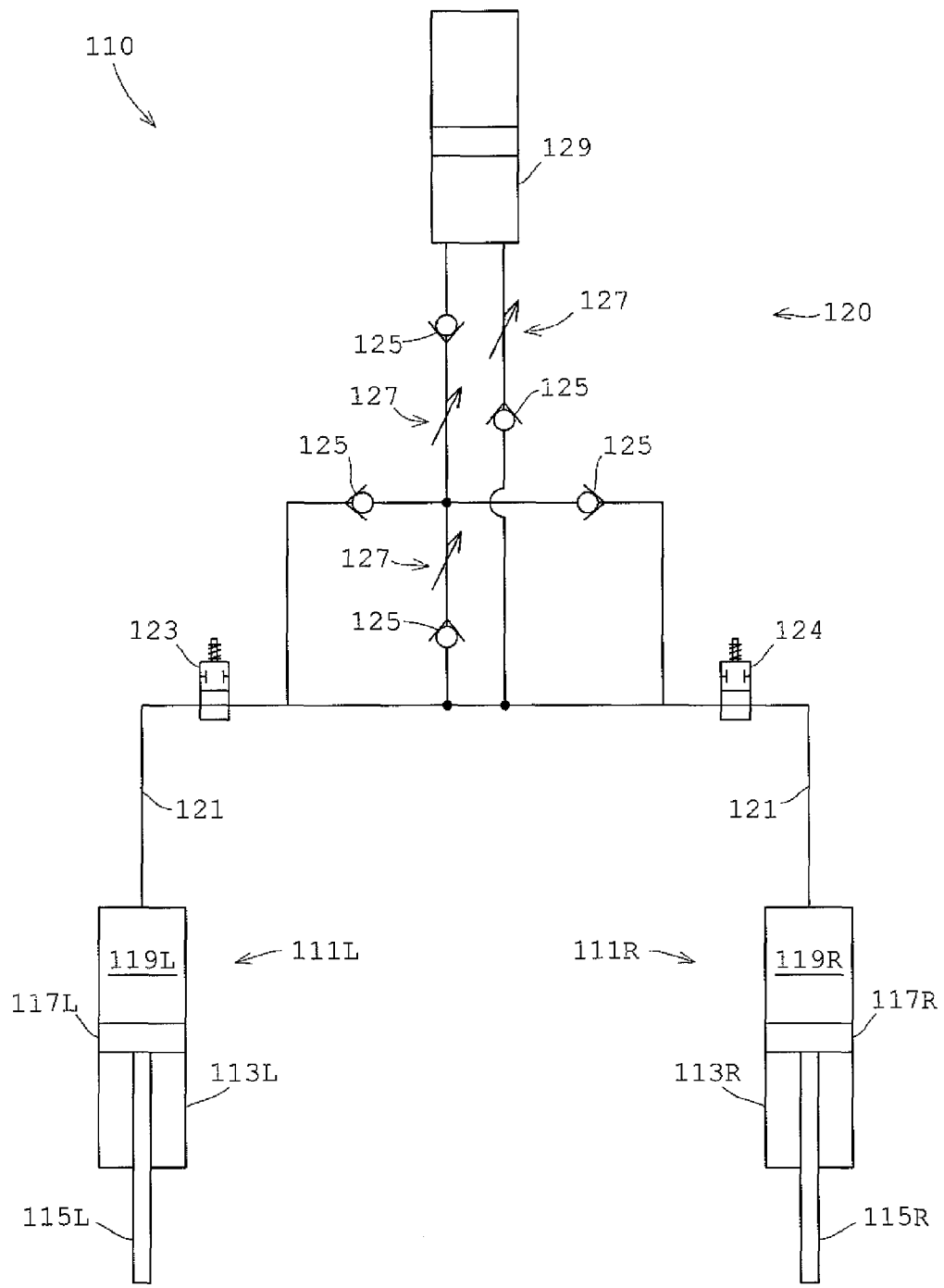
FIG. 17 is a schematic diagram of the resistance applying mechanism according to the further modified preferred embodiment of the present invention.

Reference is made to FIGS. 16 and 17. FIG. 16 is a perspective view of a principal portion of a resistance applying mechanism according to a further modified preferred embodiment of the present invention. FIG. 17 is a schematic diagram of the resistance applying mechanism according to the further modified preferred embodiment of the present invention. As shown in FIG. 16, a resistance applying mechanism 110 includes a pair of damper bodies 111R and 111L. The damper body 111R is disposed between the lower right swing arm 13R and the vehicle body. More particularly, the damper body 111R has a cylinder 113R connected to the vehicle body, and a piston rod 115R connected to the lower right swing arm 13R. This construction can damp rotation of the lower right swing arm 13R about the lower pivot shaft 14. Similarly, the damper body 111L is disposed between the lower left swing arm 13L and the vehicle body.

As shown in FIG. 17, the damper body 111R further includes a piston 117R mounted in the cylinder 113R and connected to the piston rod 115R, and an oil chamber 119R partitioned by the piston 117R. Similarly, the damper body 111L includes a piston 117L and an oil chamber 119L.

The oil chamber 119R and oil chamber 119L are interconnected by a hydraulic circuit 120. The hydraulic circuit 120 includes an oil pipe 121, solenoid-operated valves 123 and 124, a plurality of (e.g., five) check valves 125, three valves 127 and a reserve tank 129. Hydraulic oil can flow between the oil chambers 119R and 119L only through both of the solenoid-operated valves 123 and 124.

When, for example, the lower right swing arm 13R rotates about the lower pivot shaft 14 to lower the right wheel 19R and extend the piston rod 115R, the oil chamber 119R enlarges, hydraulic oil flows from the oil chamber 119L into the oil chamber 119R, and the oil chamber 119L diminishes. Consequently, the piston rod 115L retracts to pull up the lower left swing arm 13L, and the left wheel 19L rises by an amount corresponding to the descent of the right wheel 19R. Thus, the right wheel 19R and left wheel 19L go up and down by an equal amount in substantially opposite vertical directions of the vehicle body.

Here, the flow resistance of hydraulic oil serves as the damping force for damping relative movement between the cylinders 113 and piston rods 115. This damping force becomes the resistance applied to rotation of the lower right swing arm 13R and lower left swing arm 13L, and further becomes the resistance applied to the up-and-down motions of the pair of right and left wheels 19. The flow resistance of hydraulic oil is variable by the solenoid-operated valves 123 and 124. The solenoid-operated valves 123 and 124 correspond to the adjusting element according to a preferred embodiment of the present invention.

The modification including such a resistance applying mechanism 110 can dispense with the construction including the front carrier beam 23 and front suspension 25 described in above. In the controller 90, the drive circuit 98 is changed to control the resistance of the resistance applying mechanism 100 by driving the solenoid-operated valves 123 and 124.

The foregoing preferred embodiment preferably includes the gyro sensor 83 and acceleration sensor 85, and preferably detects the lean amount of the vehicle body and the angular speed of the lean amount based on detection results of these sensors. This is not limitative. An appropriate sensor is applicable as long as information on the lean amount of the vehicle body is detectable.

In the foregoing preferred embodiment, the lean angle has been described preferably as an angle of the up-and-down direction of the vehicle body inclined right or left relative to the vertical direction, but this is not limitative. That is, the present invention includes, besides the lean angle defined strictly in relation to the vertical direction, a lean angle defined substantially in relation to an approximately vertical direction. Where, for example, conditions of the traveling surface R1 have only negligible influences on the lean angle, the lean angle may be defined by a positional relationship between the vehicle body and the right and left wheels 19. As long as the traveling surface R1 is substantially flat, an amount of rotation of the front balancer beam 27 relative to the front carrier beam 23 may be detected, and a rotating angle of the front balancer beam 27 with reference to the time of neutral position may be used as it is as lean angle of the vehicle body.

In the foregoing preferred embodiment, the resistance applying mechanism 50 preferably inhibits up-and-down motions of the right and left wheels 19, but this is not limitative. For example, a resistance applying mechanism that inhibits up-and-down motions of the right and left wheels 63 may be added, or two resistance applying mechanisms may be provided for the right and left wheels 19 and 63, respectively.

In the foregoing preferred embodiment, the support mechanism relating to the right and left wheels 19 preferably is roughly divided into the right side support mechanism, left side support mechanism and balancer mechanism. The right side support mechanism and left side support mechanism are directly and pivotably supported by the main frame 11, respectively. This is not limitative. For example, each of the right side support mechanism and left side support mechanism may be indirectly supported by the main frame 11 through the balancer mechanism. In this case, each of the right side support mechanism and left side support mechanism is vertically movably interlocked to the balancer mechanism. Even if the support mechanism relating to the right and left wheels 19 is modified in this way, the right wheel 19R and left wheel 19L supported by the right side support mechanism and left side support mechanism, respectively, can conveniently be moved up and down relative to the vehicle body.

The foregoing preferred embodiment is preferably a four-wheeled automotive vehicle preferably including the right and left wheels 19 and 63 at the front and rear of the vehicle body. The vehicle may also preferably be a three-wheeled automotive vehicle having one wheel at one of the front and rear, and a pair of wheels at the other. The vehicle may also preferably be what is called a buggy or all terrain vehicle (ATV).

In the foregoing preferred embodiment, the saddle riding type vehicle 1 preferably includes wheels (right and left wheels 19 and 63), but this is not limitative. For example, the wheels may be replaced with skis, for example. A saddle riding type vehicle constructed in this way is what is called a snowmobile.

Figure 18:
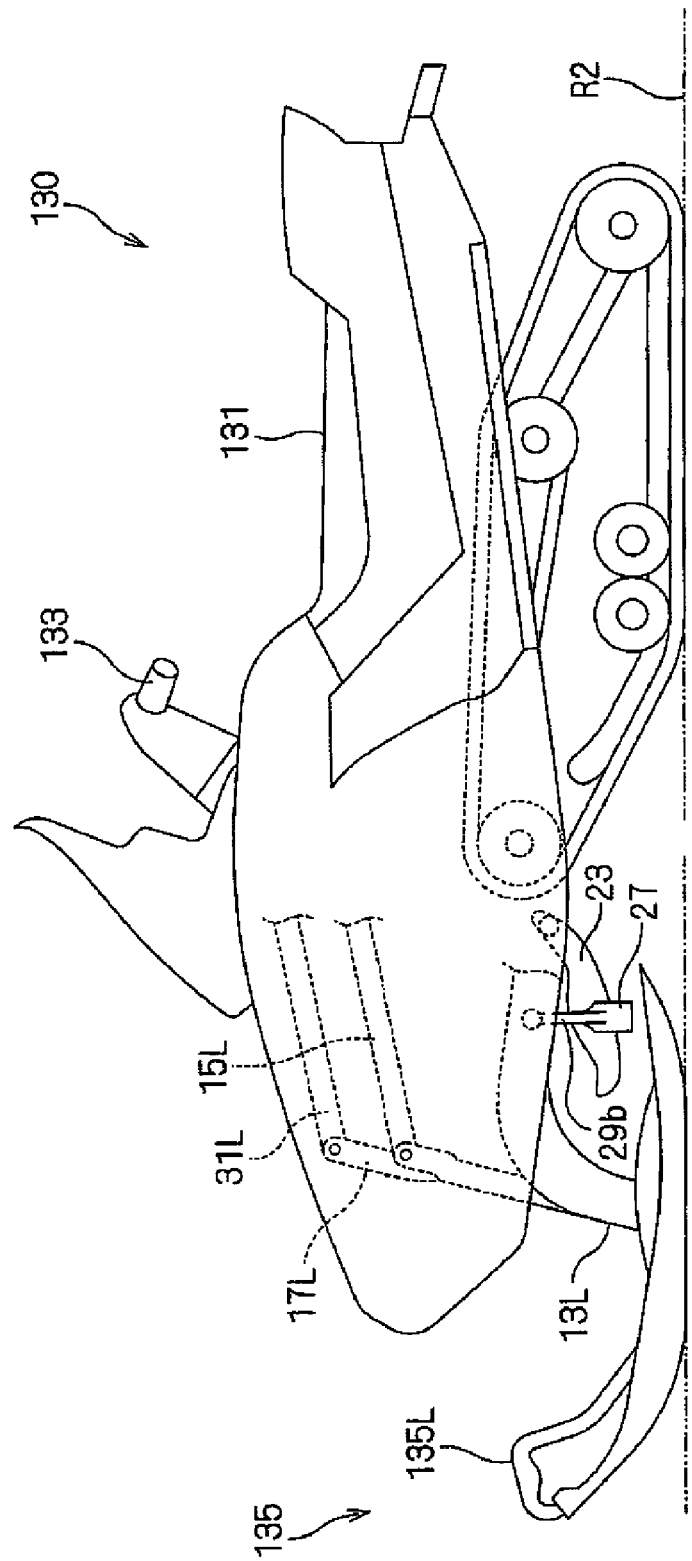
FIG. 18 is a side view showing an outward appearance of a saddle riding type vehicle according to a modified preferred embodiment of the present invention.

Reference is made to FIG. 18. FIG. 18 is a side view showing an outward appearance of a saddle riding type vehicle according to a modified preferred embodiment of the present invention. The saddle riding type vehicle according to this modified preferred embodiment is a snowmobile 130 which can travel on a snow surface R2. In FIG. 18, the left side of the drawing is the front of the snowmobile 130. The snowmobile 130 has a seat 131 for the rider, and a handlebar 133 operable by the rider. The snowmobile 130 has also a pair of skis 135 attached to the front portion of a vehicle body for contacting the snow surface R2. FIG. 18 shows only the left ski 135L disposed on the left side as seen from the rider on the snowmobile 130. The skis 135 correspond to the traveling members according to a preferred embodiment of the present invention.

The pair of right and left skis 135 are supported to be movable up and down relative to the vehicle body by the support mechanism as described above. The skis 135 are interlocked to the handlebar 133 through the steering mechanism as described above.

The lower left swing arm 13L, upper left swing arm 15L and left front tube 17L shown in FIG. 18 constitute the left side support mechanism corresponding to the left ski 135L. The front carrier beam 23, front balancer beam 27 and rod 29b constitute the balancer mechanism. Further, the left steering rod 31L forms a part of the steering mechanism.

Although not shown, the snowmobile 130 further includes the resistance applying mechanism, speed sensor 81, gyro sensor 83, acceleration sensor 85 and controller 90 as described above in Preferred Embodiment 1.

With such snowmobile 130 also, the vehicle body can conveniently be inhibited from leaning in excess of the first angle. The rider can therefore travel comfortably. This modification provides the same various functions and effects as the preferred embodiment described above.

The preferred embodiment and the modifications described above may be further varied as appropriate by replacing or combining certain components with other modifications.

The present invention may be embodied in other specific forms without departing from the spirit or essential attributes thereof and, accordingly, reference should be made to the appended claims, rather than to the foregoing specification, as indicating the scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A body leaning control system for a saddle riding vehicle capable of making turns by leaning a vehicle body, the body leaning control system comprising:
    a support mechanism arranged to support at least a pair of traveling members that contact a traveling surface and are provided at opposite sides of the vehicle body to be movable up and down relative to the vehicle body;
    a resistance applying mechanism arranged to apply to the support mechanism a resistance to up-and-down motions of the pair of traveling members;
    a lean information detecting device arranged to detect information on a lean amount of the vehicle body; and
    a controller arranged to perform control, based on detection results received from the lean information detecting device, to set the resistance of the resistance applying mechanism to a first resistance when the lean amount of the vehicle body is increasing, and to set the resistance of the resistance applying mechanism to a second resistance smaller than the first resistance when the lean amount of the vehicle body is decreasing.

2. The system according to claim 1, wherein the second resistance has a substantially minimum value of the resistance of the resistance applying mechanism.

3. The system according to claim 1, wherein the lean amount of the vehicle body is a degree of an angle at which the vehicle body leans sideways relative to a substantially vertical direction.

4. The system according to claim 1, wherein:
    a decrease in the lean amount of the vehicle body is a variation of the lean amount toward a neutral position where an up-and-down direction of the vehicle body is parallel or substantially parallel to a substantially vertical direction; and
    an increase in the lean amount of the vehicle body is a variation of the lean amount away from the neutral position.

5. The system according to claim 1, wherein the controller is arranged to perform control, based on the detection results received from the lean information detecting device, to set the first resistance to include a region where the first resistance increases with the lean amount of the vehicle body.

6. The system according to claim 1, wherein the controller is arranged to set the resistance of the resistance applying mechanism to the first resistance when the lean amount of the vehicle body is increasing and is larger than a first angle, and to set the resistance of the resistance applying mechanism to a third resistance smaller than the first resistance when the lean amount of the vehicle body is increasing and is equal to or less than the first angle.

7. The system according to claim 6, wherein the third resistance has a substantially minimum value of the resistance of the resistance applying mechanism.

8. The system according to claim 1, wherein the controller is arranged to set the resistance of the resistance applying mechanism to the first resistance when the lean amount of the vehicle body is increasing and is equal to or less than a first angle.

9. The system according to claim 1, further comprising a vehicle speed detecting device arranged to detect a vehicle speed, wherein the controller is arranged to set a first angle based on a detection result received from the vehicle speed detecting device.

10. The system according to claim 9, wherein the controller is arranged to set the first angle to include a region where the first angle increases with the vehicle speed.

11. The system according to claim 1, further comprising a vehicle speed detecting device arranged to detect a vehicle speed, wherein the controller is arranged to perform control, based on detection results received from the vehicle speed detecting device, to set the first resistance to include a region where the first resistance decreases with an increase in the vehicle speed.

12. The system according to claim 1, wherein the controller is arranged to perform control, based on detection results received from the lean information detecting device, to set the first resistance to include a region where the first resistance increases with an angular speed of the lean amount which is a variation in the lean amount of the vehicle body.

13. The system according to claim 1, wherein the support mechanism includes:
    a right side support mechanism arranged to vertically movably support a right traveling member of the pair of traveling members;
    a left side support mechanism arranged to vertically movably support a left traveling member of the pair of traveling members; and
    a balancer mechanism rotatably supported by the vehicle body and interlocked to the right side support mechanism and the left side support mechanism to allow the right traveling member and the left traveling member to move up and down in corresponding amounts in opposite directions; and
    the resistance applying mechanism includes:
        a damper body arranged to damp rotation of the balancer mechanism relative to the vehicle body; and
        an adjusting element arranged to vary a damping force of the damper body; wherein
    the controller is arranged to control a level of resistance to the rotation of the balancer mechanism by driving the adjusting element.

14. The system according to claim 1, wherein the traveling members are wheels or skis.

15. A saddle riding vehicle arranged to make turns by leaning a vehicle body, the saddle riding vehicle comprising:
- a body leaning control system including:
  - a support mechanism arranged to support at least a pair of traveling members that contact a traveling surface and are provided at opposite sides of the vehicle body to be movable up and down relative to the vehicle body;
  - a resistance applying mechanism arranged to apply to the support mechanism a resistance to up-and-down motions of the pair of traveling members;
  - a lean information detecting device arranged to detect information on a lean amount of the vehicle body; and
  - a controller arranged to perform control, based on detection results received from the lean information detecting device, to set the resistance of the resistance applying mechanism to a first resistance when the lean amount of the vehicle body is increasing, and to set the resistance of the resistance applying mechanism to a second resistance smaller than the first resistance when the lean amount of the vehicle body is decreasing.

\* \* \* \* \*